United States Patent
Singh et al.

(10) Patent No.: US 11,062,236 B2
(45) Date of Patent: *Jul. 13, 2021

(54) SELF-LEARNING ANALYTICAL ATTRIBUTE AND CLUSTERING SEGMENTATION SYSTEM

(71) Applicant: Accenture Global Solutions Limited, Dublin (IE)

(72) Inventors: Kanwar Inder Singh, Danville, CA (US); Shinichiro Shuda, Beverly Hills, CA (US); Christopher Donnelly, Winnetka, IL (US); Praveen Kishorepuria, Avon, OH (US); Aaron L. Shifrin, Deerfield, IL (US); Todd Bremer, Dove Canyon, CA (US); Vivek Nadiminti, Chicago, IL (US); Barton FitzGerald Keery, Brooklyn, NY (US); Harshavardhan Basantkumar Kar, Marietta, GA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/003,974

(22) Filed: Aug. 26, 2020

(65) Prior Publication Data
US 2020/0394564 A1    Dec. 17, 2020

Related U.S. Application Data

(63) Continuation-in-part of application No. 15/808,816, filed on Nov. 9, 2017, which is a continuation of
(Continued)

(51) Int. Cl.
*G06N 20/00* (2019.01)
*G06N 5/02* (2006.01)

(52) U.S. Cl.
CPC ............. *G06N 20/00* (2019.01); *G06N 5/022* (2013.01)

(58) Field of Classification Search
CPC ........ G06N 20/00; G06N 5/022; G06N 20/10; G06N 20/20; G06N 5/003; G06N 3/08; G06N 3/0445; G06N 3/0454; G06N 7/023
(Continued)

(56) References Cited

U.S. PATENT DOCUMENTS

| | | | |
|---|---|---|---|
| 2008/0147574 A1* | 6/2008 | Chidlovskii | G06F 16/35 706/12 |
| 2010/0017487 A1* | 1/2010 | Patinkin | G06Q 10/107 709/206 |

(Continued)

*Primary Examiner* — Dave Misir
(74) *Attorney, Agent, or Firm* — Brinks Gilson & Lione

(57) ABSTRACT

A self-learning system for analytical attribute and clustering segmentation may be provided. A text classifier may identify a log description of a log entry in response to text of the log description being associated with indicators of a word model. A datafield classifier may generate a datafield metrics including an accuracy value of the attribute identifiers representing the datafield. A metafield classifier may generate a context metrics for the context of the log entry, the context metrics including an accuracy value of the attribute identifiers representing the metafields. A combination classifier may form a weighted classification set and select an attribute identifier as being representative of the datafield based on the weighted classification set. The combination classifier may further evaluate an attribute importance value of each attribute identifier, and select an attribute identifier having a top attribute importance value.

18 Claims, 13 Drawing Sheets

Related U.S. Application Data application No. 15/467,785, filed on Mar. 23, 2017, now Pat. No. 9,818,067.

(60) Provisional application No. 62/312,962, filed on Mar. 24, 2016, provisional application No. 62/413,428, filed on Oct. 26, 2016, provisional application No. 62/452,713, filed on Jan. 31, 2017.

(58) Field of Classification Search
USPC .......................................................... 706/12
See application file for complete search history.

(56) References Cited

U.S. PATENT DOCUMENTS

| | | | |
|---|---|---|---|
| 2012/0179633 A1* | 7/2012 | Ghani | G06F 16/35 706/12 |
| 2013/0024407 A1* | 1/2013 | Thompson | G06F 16/353 706/12 |
| 2015/0019204 A1* | 1/2015 | Simard | G06F 3/0482 704/9 |
| 2016/0335260 A1* | 11/2016 | Convertino | G06F 16/2358 |
| 2017/0004413 A1* | 1/2017 | Flores | G06F 16/2365 |
| 2017/0132866 A1* | 5/2017 | Kuklinski | G07D 7/2083 |

* cited by examiner

SELF-LEARNING ANALYTICAL ATTRIBUTE AND CLUSTERING SEGMENTATION SYSTEM

This application is a continuation-in-part of U.S. Non-Provisional application Ser. No. 15/808,816 filed Nov. 9, 2017, which is a continuation of U.S. Non-Provisional application Ser. No. 15/467,785 filed Mar. 23, 2017, which claims the benefit of U.S. Provisional Application No. 62/312,962 filed Mar. 24, 2016, U.S. Provisional Application No. 62/413,428 filed Oct. 26, 2016, and U.S. Provisional Application No. 62/452,713 filed Jan. 31, 2017, the entirety of each of these applications is hereby incorporated by reference.

TECHNICAL FIELD

This disclosure relates to electronic archival systems and, in particular, to a self-learning analytical attribute and clustering segmentation system.

BACKGROUND

Systems with large quantities of data may suffer from inaccurate data classification, inefficient storage, unorganized record keeping, and other related problems. These and other deficiencies in data archival systems result in errors and inaccuracies in data organization. As large quantities of electronic data accumulate, it may become increasingly difficult to meaningfully identify and classify the electronic data in a reasonable amount of time. Thus, present approaches to electronic data storage and organization suffer from a variety of drawbacks, limitations, and disadvantages. There is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1A:
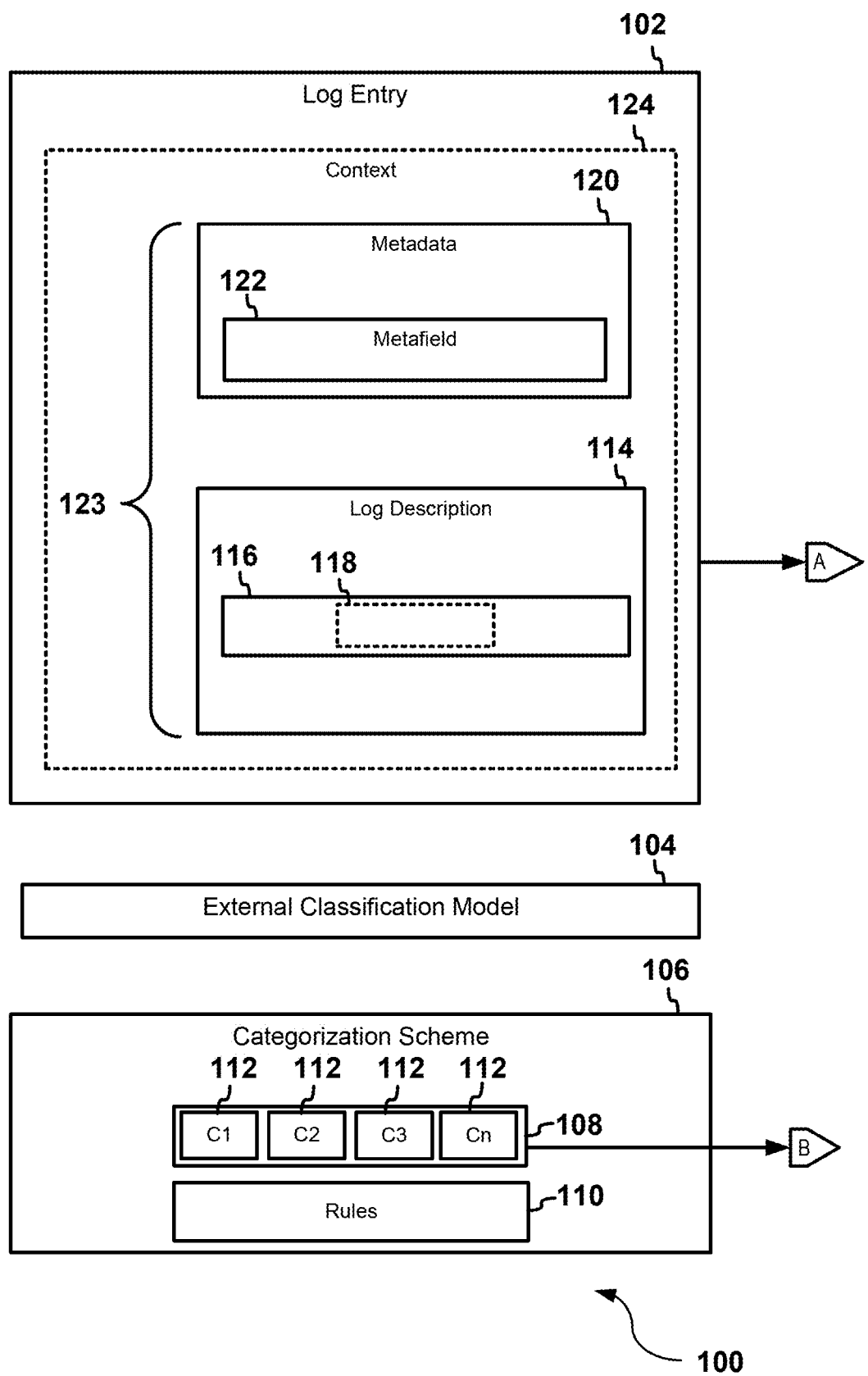
FIG. 1A-B illustrates an example of a system to classify a log entry.

Systems and methods for machine-learning categorization of information are provided. For example, a text classifier may identify, according to a log format rule, a log description of a log entry and a metafield of the log entry. The text classifier may determine that the log description includes a datafield based on a comparison of the log description with datafield indicators of a word model. A datafield classifier may generate datafield metrics for the datafield. The datafield metrics may correspond to categorical identifiers. The datafield metrics may indicate an accuracy value of a datafield categorization. The datafield categorization may include an association between the datafield and a corresponding categorical identifier, which may include an attribute identifier.

A metafield classifier may generate metadata metrics for the metafield. The metadata metrics may correspond to the categorical identifiers. The metadata metrics may indicate an accuracy value of a metafield categorization. The metafield categorization may include an association between the metafield and a corresponding categorical identifier. The system may generate a mapping between a categorical identifier of the categorical identifiers and the log entry in response a weighted metric of the weighted metrics for the log entry exceeding a predefined threshold.

A combination classifier may apply weight values to the datafield metrics and the metadata metrics. The combination classifier may generate weighted metrics for the log entry. The weighted metrics may include an accuracy value indicating a log categorization. The log categorization including an association between the log entry and the corresponding categorical identifier.

The combination classifier may further evaluate an attribute importance value of each attribute identifier, and, in response to the evaluation of the attribute importance value, select an attribute identifier of the plurality of attribute identifiers having a greatest attribute importance value.

In some forms of the present disclosure, when the log entry association is generated, a corresponding attribute associated with the selected attribute identifier may be prioritized, and a model of an implementation of resource allocations based on the log entry association may be outputted. The resource allocations and corresponding responsibilities according to the outputted model may be automatically performed.

In some forms of the present disclosure, the log entry association may be used to perform clustering. Specifically, a data type of an attribute associated with the log entry in the log entry association may be determined; a number of clusters corresponding to the data type of the attribute (e.g., quantitative data and categorical data) may be generated; the number of clusters may be provided to an artificial intelligency circuitry to evaluate performance of each machine learning model of a plurality of machine learning models; and an optimal number of clusters may be identified.

In some forms of the present disclosure, when evaluating the performance of each machine learning model, the evaluation may be based on an evaluation score that is determined based on a similarity of the clusters executed from each machine learning model to target data, and thus, a machine learning model with the highest evaluation score may be selected.

One unique feature of the systems and methods described herein may be that the context of the datafield may be used to improve the accuracy of assigning categorical identifiers of a logging scheme to the log entry. Alternatively, or in addition, an interesting feature of the systems and methods described herein may be that classifiers may be updated to continuously improve the accuracy of future associations between log entries and categorical identifiers. For example, the classifiers may use the probabilities and/or accuracy and/or priority of the log categorization to indicate whether and/or how to update the classifiers corresponding to standard category in which log entry belongs to. Additionally or alternatively, machine learning may be used to improve identification of data according to rules of a logging scheme.

Another interesting feature of the systems and methods described herein may be that the system may provide for standardized categorization of the log entry based on descriptions of prior categorization. For example, the log description may be a description of a category from a third-party categorization scheme. The system may map the log entry to a standardized category based on the log description, metafields, and whole-content of the log entry. Statistical metrics used to map the log entry to the standardized categories may be monitored to determine a need to change the standardized categorization scheme.

Figure 1B:
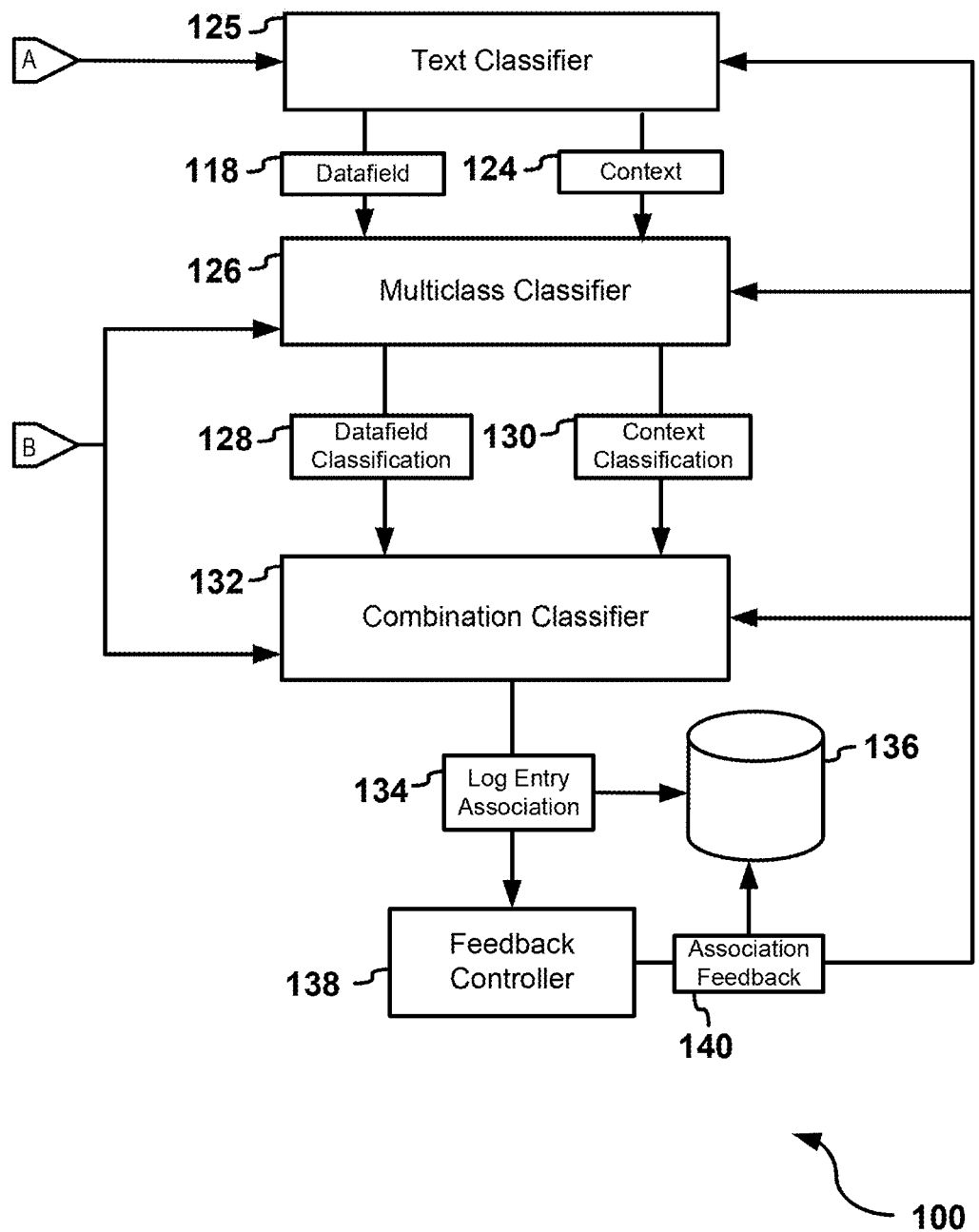

FIG. 1A-B illustrate an example of a computer implemented self-learning log classification system 100 to classify a log entry 102. Referring to FIG. 1A, a log entry 102 may be received and/or identified by the system 100. The log entry 102 may be, for example, an electronic log on a computer system. The log entry 102 may include a set of related electronic data descriptive of an event. The event may represent or result from an exception thrown on a computer system. In another example, the event may represent or result from a transaction, such as an exchange of resources in an enterprise. The system 100 may detect the event and generate the log entry 102. Alternatively, or in addition, the system 100 may receive the log entry 102 from an external system. The log entry 102 may include any data that describes the event and/or any information related to the event.

In some examples, the log entry 102 may include a file or a portion of a file. For example, the log entry 102 may include a row, a column, and/or a cell on a spreadsheet. Alternatively or in addition, the log entry 102 may include text, bitmaps, post script, HTML and any other form of digital content. In some examples, a document image may be converted into the log entry 102 through optical character recognition (OCR).

The log entry 102 may be initially classified according to an external classification model 104. The external classification model 104 may include any model capable of performing a classification and/or any classification hierarchy. For example, the external classification model 104 may include a model for classifying computer errors, such as exceptions. In another example, the external classification model 104 may include a model for classifying transactions in a general ledger. The external classification model 104 may include predefined identifiers, for example, codes, categories, or any other type of qualification indicator. Alternatively or in addition, the external classification model 104 may include descriptions of the predefined identifiers. The predefined identifiers may correspond to types of events.

The system 100 may categorize the log entry 102 according to a categorization scheme 106. The categorization scheme 106 may include any convention for qualifying, classifying and/or categorizing data. For example, the categorization scheme 106 may include a model for classifying computer errors, such as exceptions. In another example, the categorization scheme 106 may include categories of transactions, or events related to the transitions, in a general ledger. Alternatively or in addition, the categorization scheme 106 may include any model of classification and/or any classification hierarchy. The categorization scheme 106 may differ from the external classification model 104. The system 100 may re-qualify, reclassify, and/or categorize the log entry 102 from the external classification model 104 to the categorization scheme 106. For example, the log entry 102 may be reclassified from a legacy computer error code model to an updated computer error code model. Alternatively or in addition, the log entry 102 may be categorized in a resource tracking system based on a description of the transaction in a general ledger system.

The categorization scheme 106 may include the categorical identifiers 108 and rules 110. The categorical identifiers 108 may include one or more of a categorical identifier 112. The categorical identifier 112 may include a predefined identifier that represents, classifies, identifies, summarizes, enumerates and/or corresponds to information. Furthermore, the categorical identifiers 108 hereinafter may include an attribute identifier that represents, classifies, identifies, summarizes, enumerates attributes corresponding to information regarding a number of related physical segments of a business entity or organization, such as a number of commonly owned or commonly purposed structures. Examples of commonly owned or commonly purposed structures may include store locations within a consumer sales company, operating units within a company, departments in an enterprise, supply chain locations, assembly lines within a manufacturing plant, assets like an oil-field or a mine, and the like. These locations may be in the public sector as well, including but not limited to academic institutions, government offices, public safety (e.g., police station and fire station), military installations and bases, non-profit agencies, and the like. Examples of the categorical identifier 112 may include a summary, an account identifier, a number, a text label, or any other information used to identify and/or classify data.

Thus, some examples of the attributes may include internal factors (e.g., physical attributes (number of doors, type of floor, and the like), entity revenue, transactions, items sold, equipment, goods or services sold and their revenue/volume, employees (count, tenure, turnover, training, and the like), location (country, state, city, urban, rural, and the like), systems and capabilities, Internet market hierarchy, and the like), external factors (e.g., weather, regulatory restrictions), market dynamics (e.g., competitive threat (proximity, number of competitors), suppliers (level of consolidation), and the like), and customer attributes (e.g., age, income, race, and the like). The rules 110 may include a rubric for associating the categorical identifiers 108 with information. Examples of the rules 110 may include if-then-else decision functions, decision trees, text or numerical value discriminants, boundary-margin-neighborhood definition for classifiers, predetermined programmatic procedures, or any other example of rubric.

The log entry 102 may include a log description 114. The log description 114 may include information descriptive of the log entry 102. For example, the log description 114 may include information descriptive of the classification of the log entry 102 according to the external classification model 104. Alternatively or in addition, the log description 114 may include the description of a predefined identifier of the external classification model 104. For example, the log description 114 of the log entry 102 may include a description of an exception, such as "ERROR"; "WARNING"; and/or "ALERT". In another example, the log description 114 may include a description of a transaction included in a general ledger account. In additional examples, the log description 114 may include any description of a qualification of the log entry 102 and/or information included in the log entry 102. Alternatively or in addition, the log description 114 may include images, text, structured data, and/or unstructured data. In some examples, a document image may be converted into the log entry 102 or multiple log entries through optical character recognition (OCR).

The log description 114 may include text segments 116. The text segments 116 may include any portion of the log description 114. For example, the text segments 116 may include structured and/or unstructured content of the log description 114. Alternatively or in addition, the text segments 116 may include a group of characters, words, sentences, and/or paragraphs. In some examples, the text segments 116 may include spaces or other control characters in the log entry 102.

The text segments 116 may include a datafield 118. The datafield 118 may include all or a portion of the text segments 116. In other examples, the datafield 118 may include all or a portion of the log description 114. The datafield may include information relevant to the categorization scheme 106. In addition, the datafield 118 may exclude information not relevant to the categorization scheme 106. In some examples, the datafield 118 may include multiple portions of the log description 114 relevant to the categorization scheme 106. For example, the datafield 118 may include a first portion of the text segments 116 relevant to the categorization scheme 106 and a second portion of the text segments 116 relevant to the categorization scheme 106. The first portion of the text segments 116 and the second portion of the text segments 116 may be separated by a third portion of the text segments 116 not relevant to the log description 114.

The log entry 102 may include metadata 120. The metadata 120 may include any data directly or indirectly available from, or associated with, the log entry 102. For example, the metadata 120 may include information descriptive of the circumstances that caused the event corresponding to the log entry 102. Alternatively or in addition, the metadata 120 may include information descriptive of the log entry 102. For example, the metadata 120 may include a source of the log entry, a name of a person and/or entity associated with the log entry, an address of the person and/or entity, order numbers, personnel or business names, references and contacts, geographical information, dates/times associated with the log entry 102, and/or other information relevant to the log entry 102 and the industry and/or commercial practices that generated the log entry 102.

The metadata 120 may include a metafield 122. The metafield 122 may include a discrete grouping of metadata 120. For example, the metafield 122 may include text, images, or any other form of electronic data. The metafield 122 may be organized in a cell or a series of cells in a spreadsheet. Alternatively or in addition, the metafield 122 may be organized as a database. In other examples, the metafield 122 may include any other grouping of all or a portion of the metadata 120. Examples of the metafield 122 may include a name of the log entry, a source of the log entry, a name of a person and/or entity associated with the log entry, the address of the person and/or entity, order numbers, addresses, personnel or business names, references and contacts relevant to the log entry 102, geographical information, any dates or references associated with the log entry 102, and/or other information relevant to the log entry 102 and the industry and/or commercial practices that generated the log entry 102. In some examples, the metafield 122 may be included in the log entry 102. For example, the metafield may be a cell or a series of cells. Alternatively or in addition, the metafield 122 may include data that is not necessarily contained in the log entry 102, but is relevant to the log entry 102 based on the rules 110. For example, the metafield 122 may include information, such as vendor information. Alternatively or in addition, the metafield 122 may include a hierarchy of codes or text, for example, a commercial or legal entity with regional, divisional, national or continental attributes.

In some examples, the metadata may include a plurality of metafields. For example, the metadata 120 may include a first metafield including a source of the log entry 102 and a second metafield including a time of the log entry 102.

The log entry 102 may include a context 124. The context 124 may include contextual information related to the log entry. Accordingly, the context 124 may include the metadata 120. Alternatively or in addition, the context 124 may include a whole-content 123 of the log entry 102. The whole-content 123 may include an entirety of all of the information included in and/or related to the log entry 102. Accordingly the whole-content 123 may include the log description 114 and the metadata 120. Alternatively or in addition, the whole-content 123 may include information external to the log entry 102, but related the log entry 102. For example, the whole-content 123 may include the text contained in a file and the name of a file stored in a file system.

The system 100 may apply the categorization scheme 106 to all or a portion of the log entry 102. For example, the system 100 may map one or more of the categorical identifiers 106 to the log entry 102 and/or portions of the log entry 102. For example, the system 100 may determine accuracy values of the categorical identifiers representing the datafield 118 of the log entry 102 and the context 124 of the log entry 102. The system 100 may combine the accuracy values to determine an accuracy value indicating the categorical identifier 112 representing the log entry 102.

Referring to FIG. 1B, the system 100 may include a text classifier 125. The text classifier 125 may include a binary classification model that determines if the log description 114 includes the datafield 118. The text classifier 125 may receive the log entry 102. The text classifier 125 may determine that the content of the log entry 102 includes a datafield 118. For example, the text classifier 125 may identify the content of the log entry 102 that qualifies as the datafield 118. For example, the text classifier 125 may identify patterns in one or more structured and/or unstructured groupings of characters of the log description 114. In other examples, the text classifier 125 may qualify additional forms of information as the datafield 118. For example, the text classifier 125 may receive images from the log entry 102. The text classifier 125 may determine whether the images qualify as the datafield 118. For example, images may be classified as datafields using RGB or greyscale values of the image pixels as a vector of input to statistical models such as convolutional or recurrent neural networks, linear discriminant analyzers, support vector machines, and logistic regression. In another example, the text classifier 125 may include a fuzzy-matching mechanism to determine the similarity of the content of the log entry 102 with a list of datafields. In some examples, the text classifier 125 may perform statistical analysis on the content of the log description 114 to determine the existence of the datafield 118. For example, the text classifier 125 may include a machine-learning model such as a support vector machine, a bag of words, or another form of machine-learning statistical data model. In some examples, the text classifier 125 may qualify the content of the log description 114 as the datafield 118 based on text included in the log description 114.

The text classifier 125 may recognize the datafield 118 without reference to any additional information related to a position of the content in the log description 114. For example, the text classifier 125 may identify the datafield 118 without identifying an end-of-file character, end-of-line character of a control character of a character encoding or a document protocol. Alternatively or in addition, the text classifier 125 may determine the datafield 118 based on the layout of the log description 114. For example, the text classifier 125 may determine that text at a particular position qualifies as the datafield 118. Alternatively or in addition, the text classifier 125 may analyze the control characters, alphanumeric character, images, content positioning information, and/or any other information related to the log description 114 to determine the existence of the datafield 118. The portion of the log entry 102 identified as the datafield 118 may be any portion of the log description 114, including a line, cell, paragraph, word, an area identified by markers such as coordinates, rules, special characters, patterns or any other part of the log entry 102.

While the text classifier 125 illustrated in FIG. 1B receives the log description 114, other examples of the text classifier 125 may receive a text segment of the log description 114 and/or the log entry 102. For example, OCR may be performed on the log entry 102 to convert portions of an image into text. The text may be divided into text segments 116. The text segments 116 may be provided to the text classifier 125. For example, the text classifier 125 may determine that the text segments 116, or a portion of the text segments 116, qualify as the datafield 118. In some examples, the text classifier 125 may receive images. For example, the log entry 102 may include images. The text classifier 125 may determine whether one or more of the images, or parts thereof, qualify as the datafield 118. For example, the text classifier 125 may determine whether the images, or parts thereof, are relevant to the categorization scheme 106.

Additionally or alternatively, the text classifier 125 may parse the log entry 102 for the context 124. The text classifier 125 may identify the context 124 based on the content included in the log entry 102. For example, the text classifier 124 may identify the metadata 120, metafields within the metadata 120, and/or the whole content 123 of the log entry 102.

The system 100 may include a multiclass classifier 126. The multiclass classifier 126 may receive the datafield 118 and/or the context 124 and may determine the datafield classification 128 and/or context classification 130. To generate the datafield classification 128 and context classification 130, the multiclass classifier may use a machine-learning model. The machine learning model may include, for example, support vector machines, ensemble of decision trees, and logistic regression. In addition, the multiclass classifier 126 may use a fuzzy-matching mechanism. The fuzzy-matching mechanism may include, for example, probabilistic record linkage to determine a degree of the association of datafield 118 and context 124 with a list of template datafields and contexts corresponding to the categorical identifiers 108.

The datafield classification 128 may include a set of classifications of the datafield 118. The set of classifications may include a statistical metric of one or more of the categorical identifiers 108 representing the datafield 118. Thus, the datafield classification 128 may include datafield metrics. The datafield metrics may include the set of respective statistical metrics that indicate the datafield 118 is associated to the complete or partial set of categorical identifiers 108. For example, the datafield classification 128 may include statistical metrics of a categorical identifier 112 representing, summarizing, categorizing, qualifying, or otherwise characterizing the datafield 118 according to the rules 110 of the categorization scheme 106. In some examples, the datafield classification 128 may include a set of respective metrics for the datafield 118 that each of the categorical identifiers 108 is representative of the datafield 118.

The context classification 130 may include a statistical metric of one or more of the categorical identifiers 108 representing the context 124 of the datafield 118. For example, the context classification 130 may include a metric of the categorical identifiers 108 representing, summarizing, categorizing, or otherwise characterizing the context 124 of the datafield 118. In another example, the context classification 130 may include a metric that indicates the context 124 is related to the datafield 118 and is represented by one or more of the categorical identifiers 106. In some examples, the context classification 130 may include a set of respective statistical metrics corresponding to each of the categorical identifiers 108 of the categorization scheme 106. In some other examples, the context classification 130 may include a set of one or more alternative categorical identifiers 108 associated with their respective statistical metrics.

The system 100 may include a combination classifier 132. The combination classifier 132 may determine a log entry association 134 between the datafield 118 and the categorical identifier 112 based on the datafield classification 128 and context classification 130.

Referring to FIGS. 1A and 1B, the log entry association 134 may include a mapping between the log entry 102 and the categorical identifier 120. For example, the log entry association 134 may include any information that associates the categorical identifier 120 with the log entry 102. For example, the log entry association 134 may include a table that relates an ID of one or more of the categorical identifiers 108 with the log entry 102. Alternatively, the datafield association may include a label of the categorical identifier 120 and the text of the datafield 118. Thus, the log entry association 134 may include any information of the datafield 118 and the categorical identifier 112 that relates and/or links the categorical identifier 112 with datafield 118. The log entry association 134 may be stored in a memory, such as a database 136. In some examples, the log entry association 134 is stored with the categorical identifier 112, the datafield 118, and/or other related information. The log entry association 134 may be stored in any manner that relates the categorical identifier 120 with the datafield 118 or any other portion of the log entry 102. The terms log entry association and log entry mapping, as used herein, may be used interchangeably.

The database 136 may include any repository of information. For example, the database 136 may include any structured or semi-structured set of information. Additionally or alternatively, the database 136 may organize information in a relational and/or non-relational data structures. The database 136 may include and/or store the log entry 102, the log entry association 134, the association feedback 140, the external classification model 104, and/or the output of any component described herein. Additionally or alternatively, the database 136 may include and/or store statistical models, word models, and or any other model used to generate the datafield association 134 and/or the association feedback 140.

The combination classifier 132 may aggregate the datafield classification 128 and context classification 130. The aggregation may be performed in various ways. In one example, the combination classifier 132 may perform a weighted average of the datafield classification 128 and context classification 130 where the weight values are set according to business logic, count statistics, cross-validation of classifier performance, or a winner-take-all approach. The combination classifier 132 may enrich the categorization of the log entry 102 by including statistical context relevant to the categorization scheme 106. Thus, the datafield association 128 and context classification 130 are combined to provide an improved log entry association 134.

The combination classifier 132 may select the datafield classification 128 and/or context classification 130 associated with a metric greater than a predefined value. As described herein, the metric may include any statistical value that is predictive of an outcome or the reliability of the outcome. Alternatively, or in addition, the combination classifier 132 may combine datafield classification 128 and/or context classification 130 to form combined log entry associations. The combined log entry associations may include respective combined metrics of the categorical identifiers 108 being representative of the log entry 102. The combined log entry associations may be more accurate than the datafield classification 128 taken alone because the combined log entry association may be substantiated by one or more of the context classification 130 which may be indicative of contextual evidence for the datafield classification 128 available with the context 124. The contextual evidence may include, for example, information that is descriptive of the event corresponding to the log entry 102, and/or the circumstances related to the event. For example, when the log entry 102 corresponds to an error log of a computer, the contextual evidence may include, for example, the memory location of code. In another example, when the log entry 102 corresponds to a transaction, the contextual evidence may include vendor information. The context classification 130 may be based on the whole-content 123 and/or the metadata 120 of the log entry 102. Combining the context classification with the datafield classification 128 may increase the probability that the log entry association is valid.

In some examples, the system 100 may determine the mapping between the categorical identifier 112 and the log entry 102 based on the combined associations. For example, the system 100 may determine a mapping between the categorical identifier 112 of the group of categorical identifiers 108 and the log entry 102 in response a combined metric, for example a weighted metric, for the log entry 102 exceeding a predefined threshold. The predefined threshold may indicate a minimum metric required to establish the log entry association 134.

The system 100 may include a feedback controller 138. The feedback controller 138 may receive the log entry association 134 and any other information used to determine the log entry association 134, such as the datafield 118, the datafield classification 128 and/or context classification 130. The feedback controller 138 may determine the validity and/or priority of log entry association 134. The feedback controller 138 may generate association feedback 140 in response to the log entry association 134 being valid and/or invalid. Alternatively or in addition, the feedback controller 138 may determine the priority of the association feedback 140. The association feedback 140 may be supplied to the text classifier 125, the multiclass classifier 126 and/or the combination classifier 132. The text classifier 125, the multiclass classifier 126 and/or the combination classifier 132 may be responsive to the association feedback 140 to improve the validity and/or priority of future output from the text classifier 125, the multiclass classifier 126, the combination classifier 132, and/or any other machine-learning classifier in the system 100. Alternatively or in addition, any classifier receiving the association feedback 140 may derive the accuracies, priorities, probabilities and any metrics related to the log entry association 134 relevant for to update historical information and/or models included in the classifiers.

Alternatively or in addition, the feedback controller 138 may modify the rules 110 of the categorization scheme 106. For example, text, numerical data, images, and other historical data from log entries and their associated categorical identifiers 108 may be retained for compliance, training, quality control, etc. The historical data can be used by statistical classifiers to mine or generate the rules 110 that can approximate the classifications. For example, statistical classification can (1) determine the part of the log entry 102 that includes a datafield 118 and (2) determine the categorical identifier 112 associated with the datafield 118. Examples of such rules 110 include if-then-else decision functions, text or numerical value discriminants, boundary-margin-neighborhood definition for classifiers. The rules 110 may be modified over time and the rules 110 rules that perform the best in terms of accuracy and computations will be retained for automated associations between categorical identifiers 108 and future log entries.

In some examples, the system 100 may receive the categorical identifiers 108 and/or the rules 110 from a user (not shown) of the system 100. For example, the user may input the categorical identifiers 108 and/or the rules 110 into a terminal. The categorization scheme 106 may be periodically updated. When categorization scheme 106 is updated, the feedback controller 138 may generate the association feedback 140 based on past log entry associations. Alternatively or in addition, the feedback controller 138 may apply the updated logging scheme to the log entry associations that occur after the update. Thus, the system 100 may self-learn as the feedback controller 138 communicates the association feedback 140 to each classifier.

The terms "representative of" or "represents" used in conjunction with the categorical identifiers 108 may mean summarizes, categorizes, qualifies, associates or otherwise classifies the information associated with the categorical identifiers 108. In some examples, a categorical identifier 112 may be representative of the datafield 118. In other examples, a categorical identifier 112 may be representative of the context 124 of the datafield 118. A categorical identifier 112 representing the context 124 of the datafield 118 may be indicative of the context being associated with and/or including the datafield 118 represented by the categorical identifier 112. Thus, for example, the context 124 may include a file name, owner information, or other forms of metadata and whole-content data described herein. The categorical identifier 112 may be said to be representative of the context 124, for example the file name, when the context is associated with log entries that have historically included datafields that were represented by the categorical identifier. In other examples the file name or other examples of the context 124 may include the datafield 118 itself.

The terms "accuracy", "confidence", "probability" and "estimation", as described herein, may mean the quantifiable veracity of an outcome. For example, the accuracy may include a numerical probability that one of the categorical identifiers 108 is representative of the text of the datafield 118 and/or the context 124. Alternatively or in addition, the accuracy may include a statistical confidence. The multiclass classifier 126 may generate the accuracies of the datafield classification 128 and accuracies of the context classification 130, for example, based on statistical modeling of the text of the datafield 118 in conjunction with the validity of historical calculations of the accuracies of the estimation between the categorical identifiers 108 being associated with data fields. The term accuracy may be used interchangeably with estimation.

The term "metric", as described herein, can be used to describe a statistical and/or deterministic value that is predictive of an outcome or the reliability of the outcome. Thus, metrics may include indications of accuracy, confidence, probability, estimation, as described herein, and/or another term traditionally associated with statistics that describes an estimation and/or quantifies the reliability, significance, and/or veracity of the outcome. The outcome may be any classification and/or identification as described herein. For example, the outcome may include a determination generated by the text classifier 125, the multiclass classifier 126, and the combination classifier 114, or any other component of the system 100. Alternatively or in addition, the outcome may include the log entry association 134, the datafield classification 128, the context classification 130, the classification of text segments 116 as the datafield 118, or another statistical determination, association, or conclusion. The datafield metrics, metafield metrics, and the whole-content metrics may include a statistical metric.

Figure 2:
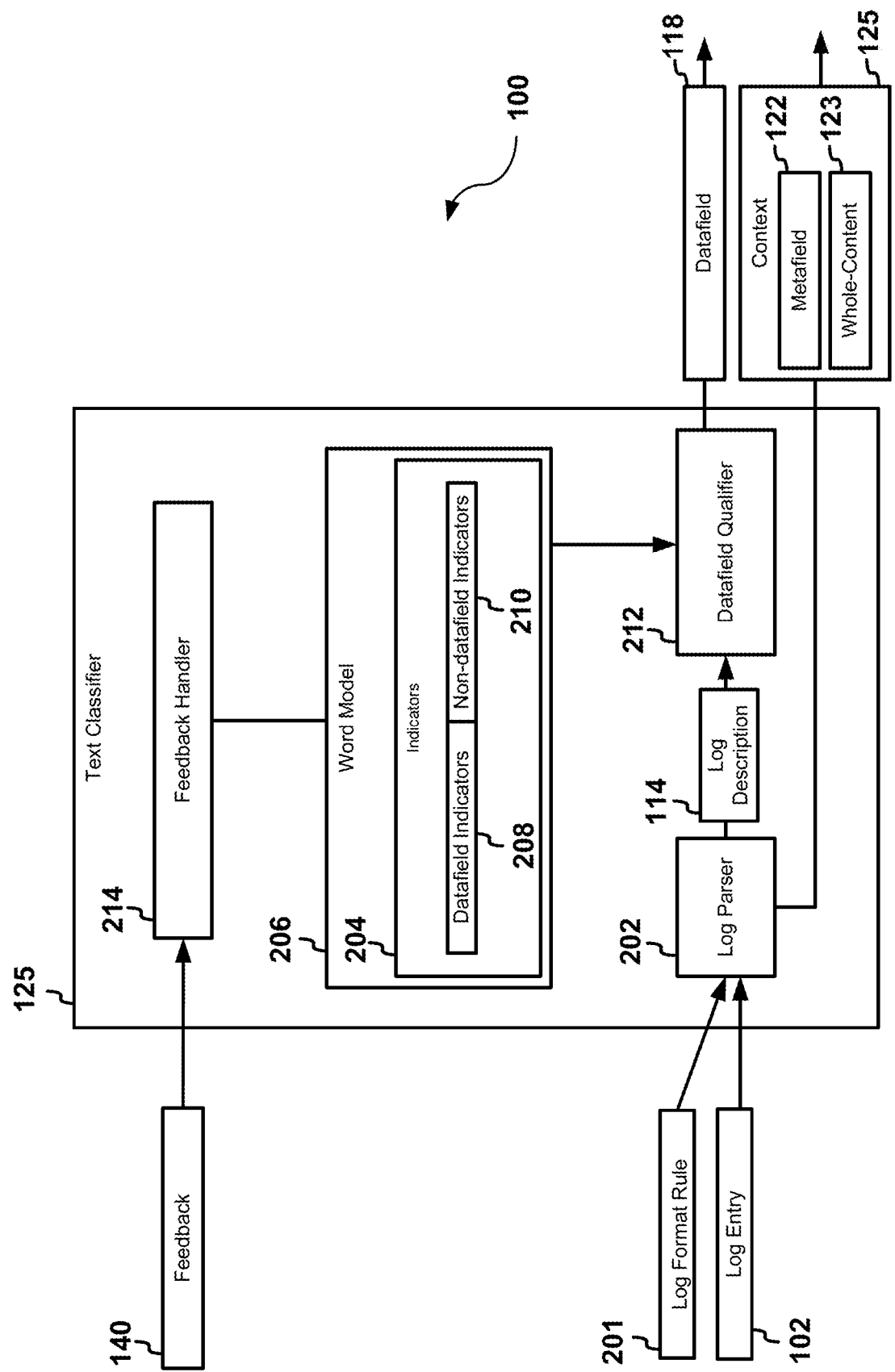
FIG. 2 illustrates an example of a text classifier.

FIG. 2 illustrates an example of the text classifier 125. The text classifier 125 may include a log parser 202. The log parser 202 may parse, according to a log format rule 201, the log description 114 of the log entry 102 and the metafields of the log entry 102. For example, the log parser 202 may separate the log description 114 from the metadata 120. Alternatively or in addition, the log parser 202 may identify the metafield 122 within the metadata 120 according to the log format rule 201. The log parser 202 may identify the datafield 118 and the context 125 in the log entry 102.

The log format rule 201 may include one or more rules or other parameters that identify the location of contents within the log entry 102. For example, the log format rule 201 may indicate the location of the log description 114 and one or more of the metafield 122. The log format rule 201 may include delimiters, markers, schemas, or any other another form of delineation of data. In some examples, the log description 114 may include the text segments 116. For example, the log format rule 201 may include indications of columns in a table that represent the metafields of the log entry 102. In other examples, the log format rule 201 may include any rule that indicates how to parse data.

The text classifier 125 may identify the datafield 118 based on the text segments 116. The text classifier 125 may identify multiple datafields from the log description 114. For example, the log description 114 may include noisy data that is unstructured. The text classifier 125 may perform statistical analysis on the log description 114 to determine one or more of the datafield 118.

In some examples, the text classifier 125 may identify a portion of the log description 114, in response to the portion of the log entry 102 being associated with indicators 204 of a word model 206. The word model 206 may include a machine learning model such as a support vector machine on a bag of words or a word vector based model capable of statistically categorizing data based on groupings of characters. The indicators 204 may include datafield indicators 208 and non-datafield indicators 210. The indicators 204 may include words, characters, and/or patterns of characters. Alternatively or in addition, the indicators 204 may include non-alphanumeric characters, control characters, or any other information that indicates the position, orientation, layout, and/or meaning of information.

The datafield indicators 208 may include a portion of the indicators 204 that are suggestive of an existence of the datafield 118. Thus, the datafield indicators 208 may suggest that the content of the log entry 102 includes the datafield 118. The non-datafield indicators 210 may include a portion of the indicators 204 that are not suggestive of the datafield 118. Thus, the non-datafield indicators 210 may suggest that the content of the log entry 102 does not include the datafield 118.

The text classifier 125 may receive the content of the log entry 102 and identify the text segments 116 of the log entry 102 with a datafield qualifier 212. In some examples, the content may include all of log entry 102 and the datafield qualifier 212 may identify the text segment that includes the datafield 118. In other examples, the text segment may have been previously extracted from the log entry 102 prior to the datafield qualifier 212 receiving the text segments 118.

The text classifier 125 may determine that the log entry 102 includes the datafield 118 based on a comparison of the text segments 116 with the indicators 204 of the word model 206. For example, the datafield qualifier 212 may apply the datafield indicators 208 and/or the non-datafield indicators 210 to a machine-learning statistical model to determine that the text segments 116 of the log entry 102 includes the datafield 118. Non-limiting examples of a machine-learning statistical model include, for example, deep learning; generalized linear models, for example, logistic regression; support vector machines using, for example, linear or radial based function kernels; decision trees such as random forests; local learners, for example, nearest neighbors; and/or lazy learning. The datafield qualifier 212 may, additionally or in the alternative, use non-statistical models such as, for example, rules-based expert systems.

In some examples, the text classifier 125 may generate an estimation of the text segments 116 including the datafield 118 based on a comparison of the text segment with the indicators 204 of the word model 206. The datafield qualifier 212 may determine that the text segment includes a datafield 118 based on the estimation of the text segment. The estimation of the text segment may include a confidence, such as a statistical probability, that the text segment includes the datafield 118. The datafield qualifier 212 may determine that the text segment includes the datafield 118 in response to the confidence being greater than a confidence threshold, such as a predefined probability. Alternatively or in addition, the datafield qualifier 212 may determine the similarity of the text segments 116 with a repository of valid datafields using, e.g., string matching methods where an appropriate string similarity metric may be considered as the confidence. The confidence threshold may be a threshold that defines the level of confidence that is sufficient to qualify the text segment as the datafield 118.

The confidence may be any quantifiable statistical representation of probability. For example, the confidence may consist of a numerical value or values that represent the degree of validity and/or priority. Thus, the confidence may include a probability, such as a numerical probability. In some examples the confidence 212 may include a number between 0 and 100. The text classifier 125 may calculate the confidence of the text segment, or other text, being the datafield 118. Confidences may be calculated by other components of the system 100. Alternatively or in addition, confidence may be calculated by any of the classifiers including the text classifier 125, multiclass classifier 126, and combination classifier 132, by using a suitable metric of the statistical or rule-based relevance of the datafield 118 and/or the context 124 with respect to the log entry 102.

The text classifier 125 may receive the association feedback 140 from the feedback controller 138. The association feedback 140 may include a validity and/or priority indication of qualifying the text segments 116 as the datafield 118. For example, the validity and/or priority indication may specify that the text segments 116 were correctly and/or incorrectly qualified as the datafield 118. In some examples, the association feedback 140 may include additional information, such as the indicators 204 that were used by the datafield qualifier 212 to qualify the text segments 116 as the datafield 118. Additionally or alternatively, the association feedback 140 may include a priority of the correction or confirmation for associating the datafield 118 with the categorical identifiers 108. Alternatively or in addition, the association feedback 140 may include the probability of the estimation of the text segments 116 being the datafield 118, or any other information that was used to qualify the text segments 116 as the datafield 118.

The text classifier 125 may include a feedback handler 214 which may be responsive to the association feedback 140. The feedback handler 214 may update the word model 206 in response to the association feedback 140. For example, the feedback handler 214 may determine that the text segment was correctly qualified as the datafield 118. The feedback handler 214 may update the datafield indicators 208 and/or the non-datafield indicators 210. Characters, groups of characters, patterns, and any other information stored in the word model 206 may be updated to increase the accuracy of future qualifications of text segments 116 as datafields. In some examples, the feedback handler 214 may update the word model 206 by adding or removing text from the word model 206. For example, the feedback handler 214 may detect an invalid qualification of the datafield 118 and remove all, or a portion, of the text of the datafield 118 from datafield indicators 208 and/or the non-datafield indicators 210. In some other examples, the feedback handler may update the word model 204 depending on the priority included in the association feedback 140 to prioritize the precision and recall of future qualifications of text segments as datafields.

In some examples, the feedback handler 214 may update the validity and/or priority corresponding to the indicators 204 of the word model 206. For example, the feedback handler 214 may update the word model 206 in response to the updates to the validity and/or priority of any of the indicators 204. In one example, the text classifier 125 may determine that the log entry 102 (for example the log description 114 and/or the text segments 116) comprises the datafield 118 in response to the priority of the indicators 204 exceeding a predefined threshold. A validity may be indicated for an indicator received by the feedback handler 214. The validity indicator may comprise an indication that a text segment includes the datafield 118. Alternatively, the validity indicator may comprise an indication that the text segment does not include the datafield 118. The feedback handler 214 may modify the priority of the datafield indicators 208 and/or non-datafield indicators 210 of the word model 206 in response to the validity indicator.

Figure 3:
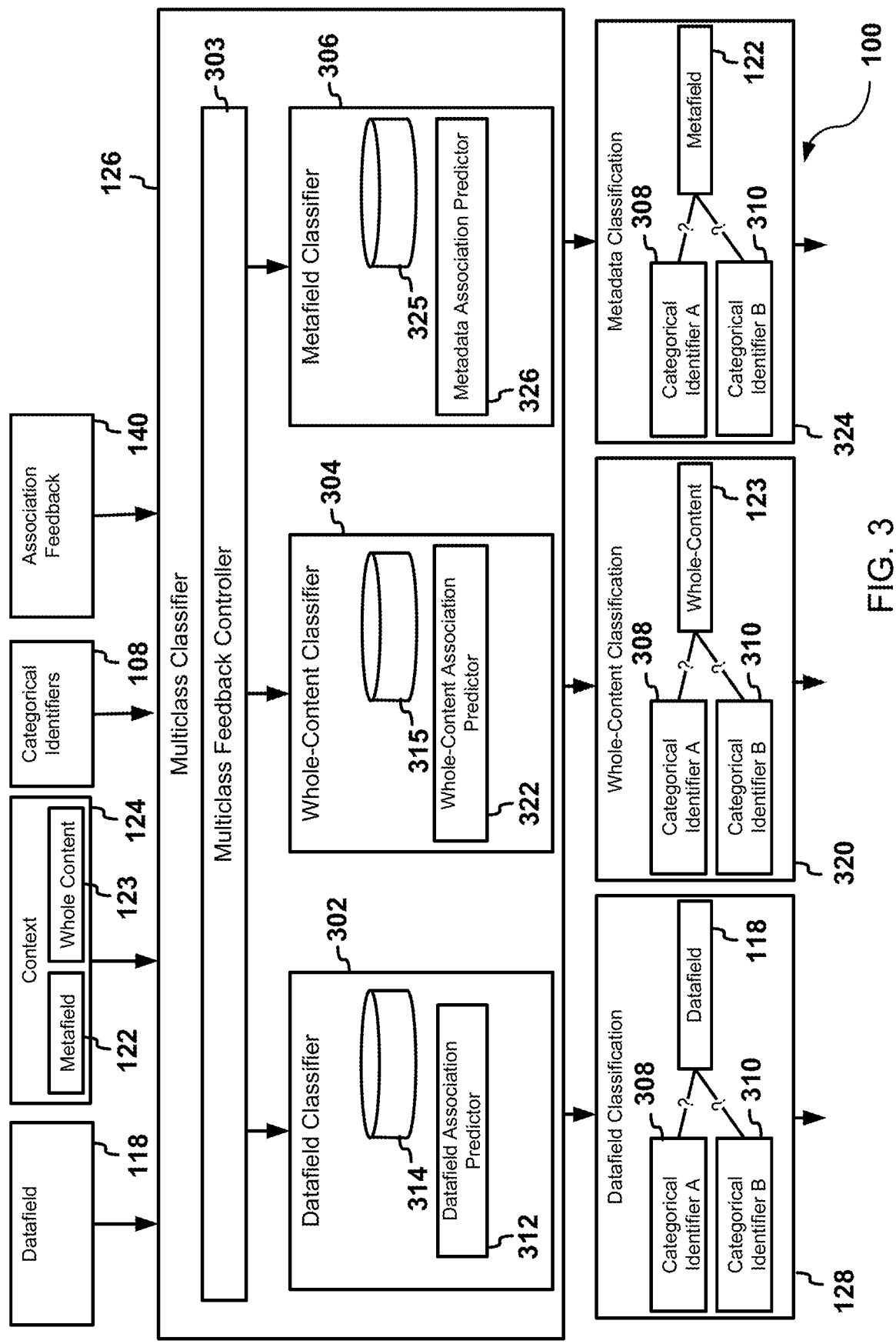
FIG. 3 illustrates an example of a multiclass classifier.

FIG. 3 illustrates an example of the multiclass classifier 126. The multiclass classifier 126 may include a datafield classifier 302, a whole-content classifier 304, and a metafield classifier 306.

The datafield classifier 302 may generate the datafield classification 128. The datafield classification 128 may include a statistical metric indicating a first categorical identifier 308 representing the datafield 118. In addition, the datafield classification 128 may include a statistical metric indicating a second categorical identifier 310 representing of the datafield 118. In other examples, the datafield classification 128 may include any number of respective statistical metrics, including estimations and/or accuracies, at least one of the categorical identifiers 108 being representative of the datafield 118.

The datafield classifier 302 may perform statistical analysis on the datafield 118 to determine the datafield classification 128. For example, the datafield classifier 302 may include a datafield association predictor 312 and a datafield association history 314. The datafield association history 314 may include a data model of previous estimated datafield associations, metrics of previous associations and/or any historical information that was used to determine the previous datafield associations. In addition, the datafield association history 314 may include corrections, updates, prioritizations and any other information regarding validity and/or priority of previous datafield associations. The datafield association estimator may refer to the datafield association history 314 to determine the datafield classification 128. For example, the datafield association predictor 312 may apply statistical models to the datafield 118 an/or predefined rules and/or the datafield association history 314 to determine the association between the categorical identifiers 108 and the datafield 118. The statistical model may include, for example, the machine learning models such as support vector machines, ensemble of decision trees, and logistic regression, or any other machine learning model as describe herein. The datafield classifier 302 may output a list of classifications corresponding to each categorical identifier associated with the datafield 118.

The datafield association history 314 and/or the datafield association predictor 312 may be generated and maintained to provide the datafield classification 128. Historical information including, for example, historical samples of datafields and/or non-datafields and their corresponding categorical identifiers 108 may be prepared. The historical information may be split into training sets and test sets. The datafields and/or non-datafields may be represented by word vectors such as bag-of-words, word2vec, doc2vec and GloVe. The datafield association history 314 may be built from the training sets to generate statistical rules such that the performance of the data field association predictor 312 in predicting the datafield classification 128 exceeds a desired threshold in terms of statistics such as accuracy, confidence, probability, precision and recall. A test set is applied to the datafield association history 314 to determine if the performance of the datafield association history 314 on the test set is also satisfactory. Once a satisfactory datafield association history 314 is obtained, the datafield association history 314 may be retained. In some examples, alternative configurations of the datafield association history 314 may be updated by, for example, adjusting the parameters of the datafield association predictor 312 and/or modifying the datafield association history 314. Moreover, a rules-based word model and/or a word model based on prior knowledge may be incorporated in the datafield association history 314.

In some examples, the first multi-class classifier 302 may receive the text of the datafield 118 and an indication that the text does not represent the datafield 118. For example, the text classifier 125 may supply the indication to the first multi-class classifier 302. Alternatively, the multiclass classifier 126 may receive the confidence 212 of the datafield qualification and determine the confidence 212 does not satisfy a confidence threshold.

The datafield classifier 302 may receive the association feedback 140. The association feedback 140 may include any information that was relevant to the log entry association 134. For example, the association feedback 140 may include a validity identifier and/or priority identifier for the log entry association 134 that was made by the combination classifier 132. Alternatively or in addition, the association feedback may include the datafield 118 and/or the portion of the categorical identifiers 108 that were correctly and/or incorrectly associated. In some examples, the datafield classifier 302 may query previous datafield association estimations in the datafield association history 314.

The datafield classifier 302 may determine a validity and/or priority of the datafield classification 128 based on the association feedback 140. The datafield classifier 302 may determine that the datafield classification 128 was too confident. In other examples, the datafield classifier 302 may determine that the datafield classification 128 was less than a desired confidence threshold. In some other examples, the datafield classifier 302 may determine that the datafield classification 128 was of reduced priority. The datafield classifier 302 may update the statistical models based on the association feedback 140 to increase the accuracy of future estimations. For example, the datafield association history 314 may not be updated if the association feedback was of reduced priority. In on example, the priority of the datafield classification 128 in the datafield association history 314 may be used to establish future datafield classifications. For example, datafield 118 of the log entry 102 may be compared to previously classified datafields. Previous classified datafields with a priority greater than a predefined threshold may be considered by the datafield association predictor 322.

Alternatively or in addition, the datafield association history 314, or the training dataset used to build the datafield association history 314, may expand to include the association feedback 140. In some examples, when a sufficient amount of association feedback 140 has been received to warrant an update of the datafield association history 314 (e.g., rate of erroneous data field classifications has become higher than an acceptable value, number of high priority classifications or misclassifications has reached a certain threshold, etc.), the datafield association history 314 is updated using an expanded dataset generated based on the datafield association history 314. Alternatively, or in addition, the datafield association predictor 312, and any statistical models comprising the datafield association predictor 312, may be updated based on the association feedback 140 and/or gained knowledge based on commercial/industrial practices.

The system 100 may include additional classifiers that use the context 124 of the datafield 118 to determine the context classification 130. In some examples, the context 124 may include an entirety of the log entry 102, including for example, the log description 114 (and any datafields therein) and each metafield 122. Accordingly, the system 100 may include a whole-content classifier 304. The whole-content classifier 304 may generate the whole-content classification 320. The whole-content classification 320 may include an estimation of the first categorical identifier representing of the whole-content 123 of the log entry 102. For example, the whole-content classification 320 may include a metric that the first categorical identifier 308 is representative of whole-content 123 of the log entry 102. In addition, the whole-content classification 320 may include a metric that the second categorical identifier 310 is representative of whole-content 123 of the log entry 102. In other examples, the whole-content classification 320 may include any number of respective metrics of each categorical identifier of the categorical identifiers 108 being representative of the whole-content 123 of the log entry 102.

The whole-content classifier 304 may include a machine learning text classifier that analyzes the whole-content 123 of the log entry 102. The whole-content classifier 304 may convert the entire log entry 102 text to a word vector, used as input to a machine learning classifier (e.g. logistic regression, artificial neural network, and/or other statistical models). The word vector can be constructed in several ways such as a bag-of-words vector indicating word frequencies or word2vec indicating word separation, or distributed representations of sentences and documents such as Doc2Vec and GloVe.

The whole-content classifier 304 may perform statistical analysis on the whole-content 123 of the log entry 102 to determine the whole-content classification 320. For example, the whole-content classifier 304 may include a whole-content predictor 322 and a whole-content association history 315. The whole-content association history 315 may include information related to previous estimated whole-content associations. For example, the whole-content association history 315 may include a data model of previous whole-content associations, an accuracy value of each previous whole-content associations, a validity and/or priority of each of the previous content associations and other information related to the previous estimated whole-content associations. In addition, the whole-content association history 315 may include corrections, updates, and any other information regarding the validity and/or priority of the previous datafield associations.

The whole-content predictor 322 may refer to the whole-content association history 315 to determine the estimated whole-content classification 320. For example, the whole-content predictor 322 may apply statistical models and/or word models to the whole-content 123 of the log entry 102, the categorical identifiers 108, and/or the whole-content association history 315. The whole-content classifier 304 may output a list of respective classifications corresponding to each of the respective categorical identifiers 108 being associated with the whole-content 123 of the log entry 102. The respective classification may include a probability that the log entry 102 is associated with a corresponding categorical identifier.

The whole-content association history 315 and/or the whole-content association predictor 322 may be generated and maintained to provide the whole-content classification 320. Historical information including, for example, historical samples of the whole-content 123 of log entries and their corresponding categorical identifiers 108 may be prepared. The historical information may be split into training sets and test sets. The whole-content of log entries may be represented by word vectors such as bag-of-words, word2vec, doc2vec and GloVe. The whole-content association history 320 may be built on the training sets to generate statistical rules such that the performance of the whole-content association predictor 322 in predicting the whole-content classification 320 exceeds a desired threshold in terms of statistics such as accuracy, confidence, probability, precision and recall. A test set is applied to the whole-content association history 315 to determine if the performance of the whole-content association history 315 on the test set is also satisfactory. Once a satisfactory whole-content association history 315 is obtained, the whole-content association history 315 may be retained. In some examples, alternative configurations of the whole-content association history 315 may be updated by, for example, adjusting the parameters of the datafield association predictor 312 and/or modifying the whole-content association history 315. Moreover, a rules-based word model and/or a word model based on prior knowledge may be incorporated in the whole-content association history 315.

The whole-content classifier 304 may receive the association feedback 140. The association feedback 140 may include information indicative of a validity and/or priority of the log entry association 134 that was made based on the whole-content classification 320. For example, the association feedback 140 may include any information that was relevant to generating the log entry association 134. In some examples, as previously discussed, the association feedback 140 may additionally include the datafield 118 and the categorical identifiers 108 that were correctly and/or incorrectly associated. In some examples, the whole-content classifier 304 may search the whole-content association history 315 using the information provided by the association feedback 140 and update the whole-content association history 315 based on the association feedback 140.

The whole-content classifier 304 may determine a validity and/or priority of one or more datafield classification 128 based on the association feedback 140. For example, the whole-content classifier may determine that the whole-content classification 320 were too confident. In other examples, the datafield classifier may determine that the whole-content classification 320 included an estimation metric that was greater or less than a confidence threshold. Alternatively or in addition, the whole-content classifier 304 may determine the priority of the whole-content classification 320. For example, the metafield classifier 306 may update the priority of whole-content classification in the whole-content association history 315. The priority of the whole-content classification 320 in the whole-content association history 315 may be used to establish future whole-content classifications. For example, whole-content 123 of the log entry 102 may be compared to the whole-content 123 of log entries previously classified. Previous whole-content classification with a priority greater than a predefined threshold may be considered by the whole-content association predictor 322.

The whole-content classifier 304 may update the statistical models based on the association feedback 140 to increase the accuracy of future predictions. For example, the whole-content association history 315, or the training dataset used to build the datafield association history 314, may expand to include the association feedback 140. In some examples, the whole-content classifier 304 may determine, based on the priority included in the association feedback 140, that the whole-content classification 320 did not exceed an importance threshold to warrant an expansion of the whole-content association history 315. In some examples, when a sufficient amount of association feedback 140 has been received to warrant an update of the whole-content association history 315, the whole-content association history 315 is updated using an expanded dataset generated based on the datafield association history 314. Alternatively, or in addition, the whole-content association predictor 322, and any statistical models comprising whole-content association predictor 322, may be updated based on the association feedback 140 and/or gained knowledge based on commercial/industrial practices.

In some examples, the context 124 may include the metafield 122 of the log entry 102. Accordingly, the system 100 may include the metafield classifier 306. The metafield classifier 306 may generate a metadata classification 324. The metadata classification 324 may include an estimation that the first categorical identifier 308 is representative of the metafield 122 of the log entry 102. For example, the metadata classification 324 may predict the metafield 122 of the log entry 102 is associated with the first categorical identifier 308. In addition, the metadata classification 324 may be predictive of the second categorical identifier 310 being representative of the log entry 102. In other examples, the metadata classification 324 may include metrics of the categorical identifiers 108 representing of the metafield 122.

The metafield classifier 306 may include a classifier that applies machine learning to past frequencies of categorical identifiers 108 mapped with the log entries that include the metafield 122. The metafield classifier 306 may perform statistical analysis on the metafield 122 of the log entry 102 to determine the metadata classification 324. For example, the metafield classifier 306 may include a metadata association predictor 326 and a metadata association history 325. The metadata association history 325 may include information related to previous metadata associations. For example, the metadata association history 325 may include a data model of previous metadata associations, metrics of the previous metadata associations, and a validity of each of the previous metadata associations and other information related to the previous metadata associations. In addition, the metadata association history 325 may include corrections, updates, and any other information regarding the validity of the previous datafield associations. The metadata association predictor 324 may refer to the metadata association history 325 to determine the metadata classification 324. For example, the metadata estimator 324 may apply statistical models and/or word models to the metafield 122 of the log entry 102, the categorical identifiers 108, and/or the metadata association history 325. The metadata association predictor 326 may output a list of classifications corresponding to each of the categorical identifiers 108 being associated with the metafield 122 of the log entry 102. The classifications may include metrics for the categorical identifiers 108 that the metafield 122 is associated with at least one datafield that is associated with a corresponding categorical identifier.

The metadata association history 325 and/or the metadata association predictor 326 may be generated and maintained to provide the metadata classification 324. Historical information including, for example, historical samples of the metafield 122 and their corresponding categorical identifiers 108 may be prepared. The historical information may be split into training sets and test sets. The metadata association history 325 may be represented by the word vectors, as described in other examples herein, and come from a diverse set of sources including, for example, logs or extracts from databases, process configurations and performance indicators, process summaries, and reports. The metadata association history 325 may be built on the training sets to generate statistical rules such that the performance of the metadata association predictor 326 in predicting the metadata classification 324 exceeds a desired threshold in terms of statistics such as accuracy, confidence, probability, precision and recall. A test set is applied to the metadata association history 325 to determine if the performance of the metadata association history 325 on the test set is also satisfactory. Once a satisfactory metadata association history 325 is obtained, the metadata association history 325 may be retained. Alternatively or in addition, abnormalities or outliers may be discovered as a result of, for example, anomalous accuracy, confidence, probability, precision or recall statistics or any preconfigured rules. Abnormalities or outliers in metadata association may be removed from or flagged in the metadata association history 325. In some examples, alternative configurations of the metadata association history 325 may be updated by, for example, adjusting the parameters of the metadata association predictor 326 and/or modifying the metadata association history 325. Moreover, a rules-based word model and/or a word model based on prior knowledge may be incorporated in the metadata association history 325.

The metafield classifier 306 may receive the association feedback 140. The association feedback 140 may be indicative of the validity and/or priority of the log entry association 134. For example, the association feedback 140 may include any information that is relevant to generating the log entry association 134, such as the metafield 122 itself. In some examples, as previously discussed, the association feedback 140 may additionally include the datafield 118 and the categorical identifiers 108 that were correctly and/or incorrectly associated. The metafield classifier 306 may search for the previous metadata associations in the metadata association history 325 of the metafield classifier 306. For example, the metadata association history 325 of the metafield classifier 306 may be searched using the association feedback 140.

The metafield classifier 306 may determine a validity and/or priority indication of the metadata classification 324 based on the association feedback 140. The metafield classifier 306 may update the statistical models included in the metadata association predictor 326 based on the association feedback 140 to increase the accuracy of future predictions. Alternatively or in addition, metadata association predictor 326 may update the association history 325 based on the association feedback 140. For example, the feedback handler 216 may determine that the metadata classification 324 included an estimation metric that was greater or less than a confidence threshold. Alternatively or in addition, the metafield classifier 306 may determine the priority of the metadata classification 324. For example, the metafield classifier 306 may update the priority of metadata classification in the metadata association history 325. For example, the metafields of the log entry 102 may be compared to previously classified metafields. Previous metadata classifications with a priority greater than a predefined threshold may be considered by the metadata association predictor 326.

In other examples the metadata association history 324, or the training dataset used to build the metadata association history 324, may expand to include the association feedback 140. In another example, the metadata association history 324 may not be expanded due to the lower priority indicated by the association feedback 140. In some examples, when a sufficient amount of association feedback 140 has been received to warrant an update of the metadata association history 324, the metadata association history 324 is updated using an expanded dataset generated based on the metadata association history 324. In other examples, when a sufficient priority association feedback 140 was received for a metafield 122 or when a number of metafields with a certain priority has been received, the metadata association predictor 326 may be updated, Alternatively or in addition, the metadata association predictor 326, and any statistical models comprising the metadata association predictor 326, may be updated based on the association feedback 140 and/or gained knowledge based on commercial/industrial practices.

Figure 4:
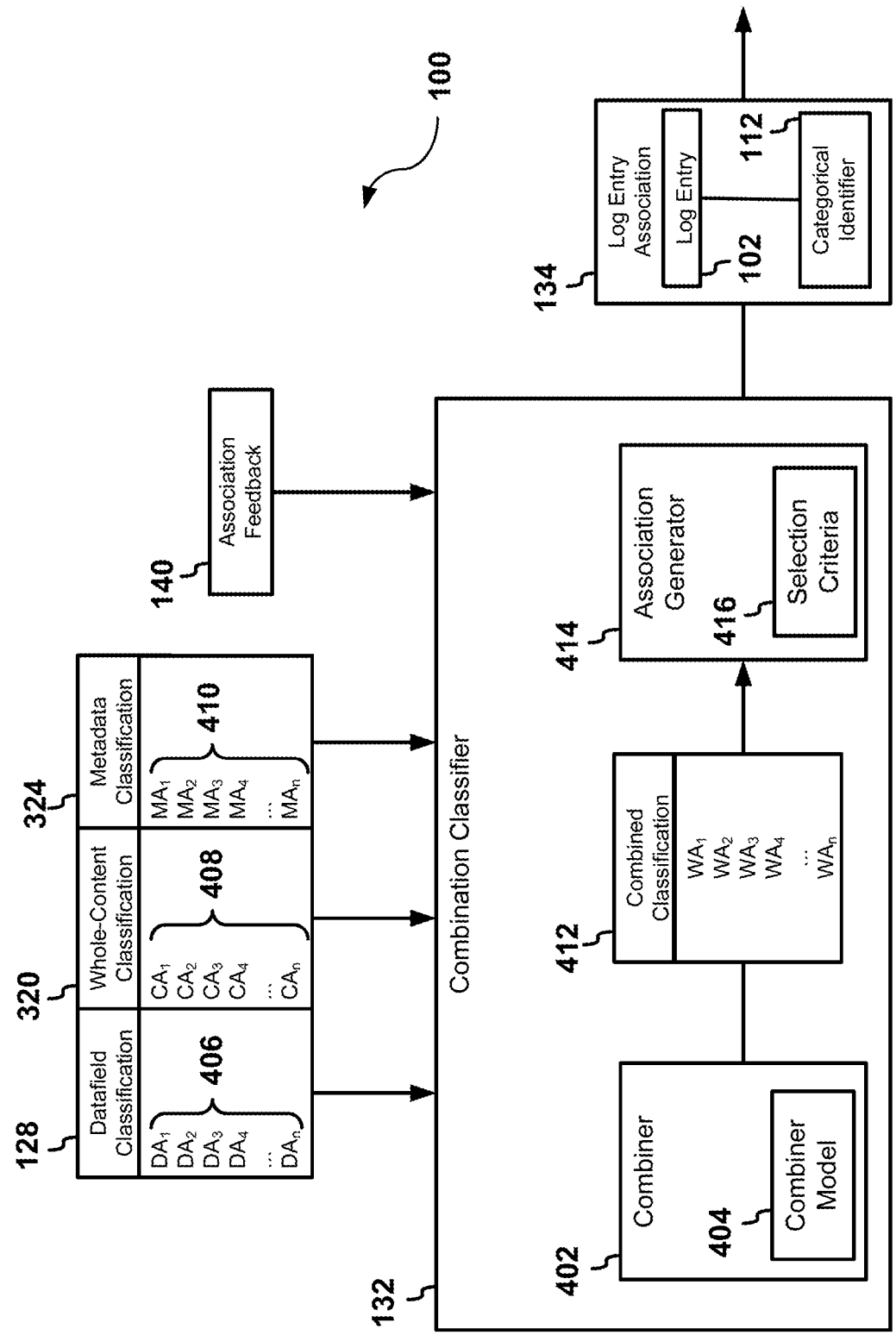
FIG. 4 illustrates an example of a combination classifier

FIG. 4 illustrates an example of the combination classifier 132. The combination classifier 132 may receive the datafield classification 128 and the context classification 130. The combination classifier 132 may calculate the log entry association 134 based on the datafield classification 128 and context classification 130.

The combination classifier 132 may include a combiner 402. The combiner 402 may include statistical models to combine the output from each of the multiclass classifier 126. For example, the combiner 402 may include a combiner model 404. The combiner model 404 may combine the datafield classification 128 and the context classification 130 from the multiclass classifier 126. For example, the combiner model 404 may combine datafield metrics 406, whole-content metrics 408, and/or metafield metrics 410.

The datafield classification 128 may include datafield metrics 406. The datafield metrics 406 may correspond to a portion of categorical identifier of the categorical identifiers 108. The datafield metrics 406 may include an identifier indicating an accuracy value of a datafield categorization. The datafield categorization may include an association between the datafield 118 and a corresponding categorical identifier. For example, the datafield categorization may include a mapping between the categorical identifier 112 and the datafield 118. In some examples, the datafield categorization may include a potential classification of the datafield to a category identified by the categorical identifier 112. In other examples, the datafield categorization may be stored in a database. Alternatively or in addition, the datafield categorization may be generated dynamically as the datafield classifier 302 (FIG. 3) creates one or more of the datafield metrics 406. For example, the datafield classifier 302 may supply the datafield 118 and the categorical identifier 112 of the datafield categorization to the datafield association predictor 312 to determine the datafield metrics 406.

The whole-content classification 320 may include whole-content metrics 408 for the whole-content 123 of the log entry 102. The whole-content metrics 408 may correspond to categorical identifiers 108 of the group of categorical identifiers 108. The whole-content metrics 408 may include an accuracy value of a whole-content categorization. The whole-content categorization may include an association between the whole-content 123 of the log entry 102 and the corresponding categorical identifier. For example, the whole-content categorization may include a mapping between the categorical identifier 112 and the whole-content 123 of the log entry 102. In some examples, the whole-content categorization may include a potential classification of the whole-content to a category identified by the categorical identifier 112. In other examples, the whole-content categorization may be stored in a database. Alternatively or in addition, the whole-content categorization may be generated dynamically as the datafield whole-content classifier 304 (FIG. 3) creates one or more of the whole-content metrics 408. For example, the whole-content classifier 304 may supply the whole-content 123 of the log entry 102 and the categorical identifier 112 to the whole-content association predictor 322 to determine the whole-content metrics 408.

The metadata classification 320 may include metafield metrics 410. The metafield metrics 410 may correspond to each categorical identifier of the group of categorical identifiers 108. The metafield metrics 410 may include an accuracy value of a metafield categorization. The metafield categorization may include an association between the metafield 122 and a corresponding categorical identifier. For example, the metafield categorization may include a mapping between the categorical identifier 112 and the metafield 122. In some examples, the metafield categorization may include a potential classification of the metafield to a category identified by the categorical identifier 112. In other examples, the metafield categorization may be stored in a database. Alternatively or in addition, the metafield categorization may be generated dynamically as the metafield classifier 306 (FIG. 3) creates one or more of the metafield metrics 410 For example, the metafield classifier 306 may supply the metafield 122 and the categorical identifier 112 to the datafield association predictor 326 to determine the metafield metrics 410.

The combiner model 404 may generate a combined classification 412. The combined classification 412 may include a modified version of the datafield classification 128 that is enhanced by the context classification 130. For example, the combined classification 412 may include a modified metric of one or more of the categorical identifiers 108 being representative of the datafield 118. For example, the combined classification 412 may include one or more respective metrics corresponding to a respective categorical identifier of the group of the categorical identifiers 108. At least one metric of the combined classification 412 may correspond to the respective categorical identifier.

In some examples, the combiner model 404 may include a weighting model. For example, the combiner 402 may, according to the weighting model, apply weight values to each respective metric in the datafield classification 128, the whole-content classification 320, and the metadata classification 324. As illustrated in FIG. 4, the combiner 402 may apply a first weight value to datafield classification 128, a second weight value to the whole-content classification 320, and a third weight value to the metadata classification 324. The combiner 402 may combine the datafield 116, the whole-content 320, and the metadata 324 to form the combined classification 412. The combined classification 412 may include one or more weighted metrics of each of the categorical identifier 120 being indicative of the datafield 118. At least one of the weighted metrics may correspond to a respective categorical identifier in the categorical identifiers 108.

For example, as illustrated in FIG. 4, the combined classification 412 may include the weighted metrics designated $WA_1$ through $WA_n$. The datafield classification 128 may include the datafield metrics 406 identified as $DA_1$ through $DA_n$. The whole-content classification 320 may include the whole-content metrics 408 identified as $CA_1$ through $CA_n$. The metadata classification 324 may include the metadata metrics 406 identified as $MA_1$ through $MA_n$. A respective weighted metric $WA_k$ may be generated by combining respective datafield metric $DA_k$, a respective whole-content metric $CA_k$, and/or a respective metadata metric $MA_k$. In some examples, the weighted metric $WA_k$ may be a weighted average of the respective datafield metric $DA_k$, the respective whole-content metric $CA_k$, and/or the respective metadata metric $MA_k$.

The combination classifier 132 may include an association generator 414. The association generator 414 may generate the log entry association 134 based on the combined classification 412. For example, the association generator 414 may receive the combined classification 412. In another example, the association generator 414 may identify a log entry association 134 that may be statistically preferred by a majority of datafield classifications and/or whole-content classifications, and/or metadata classifications. For example, the association generator 414 may identify a log entry association 134 by calculating an attribute importance value of each attribute identifier and ranking the attribute importance value in a predetermined order. The attribute importance value may include a normalized value directed to the importance of each attribute relative to other attributes. In doing so, various machine learning techniques such as XGBoost, GBM, Random Forest may be used. Nevertheless, even an attribute with a high attribute importance value may be excluded on a needed basis if a predetermined rule, such as a business judgment rule is applied, thereby narrowing the most relevant attribute based on the attribute importance value, The process of attribute selection is discussed further elsewhere, including with regard to FIG. 9. The association generator 414 may apply selection criteria 416 to the combined classification 412. The association generator 414 may determine an association between the datafield 118 and the categorical identifier 112 that represents the datafield based on the selection criteria 416. Accordingly, the association generator 414 may determine the log entry association 134.

The selection criteria 416 may include criteria that are used to determine which association one or more of the combined classification 412 should be used to make the log entry association 134. For example, the combined classification 412 may include a confidence, such as a probability. The selection criteria may provide for selecting one or more combined classifications 412 with a confidence value that satisfies a predefined threshold. Alternatively or in addition, the selection criteria may provide for selecting the combined classification 412 with the highest confidence, such as the highest non-zero probability. Further, the selection criteria 416 may include criteria that may be used to evaluate or calculate the attribute importance value of each attribute associated with a corresponding attribute identifier. Thus, as illustrated in the example in FIG. 4, the selection criteria 416 may provide for selecting the categorical identifier 112 corresponding to the highest weighted metric of $WA_1$ through $WA_n$. In some examples, the selection criteria 410 may break any equally combined classification at random and/or select a log entry association 134 based on a predefined decision rule.

The combination classifier 132 may receive the association feedback 140. The association feedback 140 may include information descriptive of a validity and/or priority of the log entry association 134 that was made based on the combiner model 404 and/or the selection criteria 416. The association feedback 140 may further include information descriptive of a priority of a specific attribute associated with a specific attribute identifier. In addition, the association feedback information may include one or more combined classification 412 that was used by the selection criteria 416 to generate the log entry association 134. The combination classifier 132 may update the combiner model 404 and/or the selection criteria 416 based on the association feedback. For example, combination classifier 132 may determine that the combined classification 412 have exceeded a confidence threshold. Alternatively, the combination classifier 132 may determine that the combined classification 412 were lower than a confidence threshold. In other examples, the combination classifier 132 may determine that the combiner model 404 may or may not be updated depending on the priority of the log entry association 134.

In some examples, the combination classifier 132 may update the weights used by the combiner model 404. For example, the combiner model 404 may include the weighting model, as previously discussed. The combination classifier 132 may update the weight values applied to the datafield classification 128, the whole-content classification 320, and/or the metadata classification 324. For example, the combination classifier 132 may determine that too much weight is applied to output from the datafield classifier 302, the whole-content classifier 304, and/or the metafield classifier 306. In response, the combination classifier 132 may update the combiner model 404 to change the amount of weight provided to the output of any of the datafield classifier 302, the whole-content classifier 304, and/or the metafield classifier 306. In another example, the combination classifier 132 may apply an adjusted weight to the output based on association feedback 140, including, for example the validity and/or priority of previous log entry associations.

The combination classifier 132 may also update the selection criteria 416 in response to the association feedback 140. For example, selection criteria 416 may generate the log entry association 134 for confidences greater than a confidence threshold. The combination classifier 132 may update the confidence threshold in response to the association feedback 140. For example, the association feedback 140 may indicate an incorrect log entry association with one of the categorical identifiers 108. The combination classifier 132 may increase the confidence threshold in response to the association feedback 140.

Figure 5A:
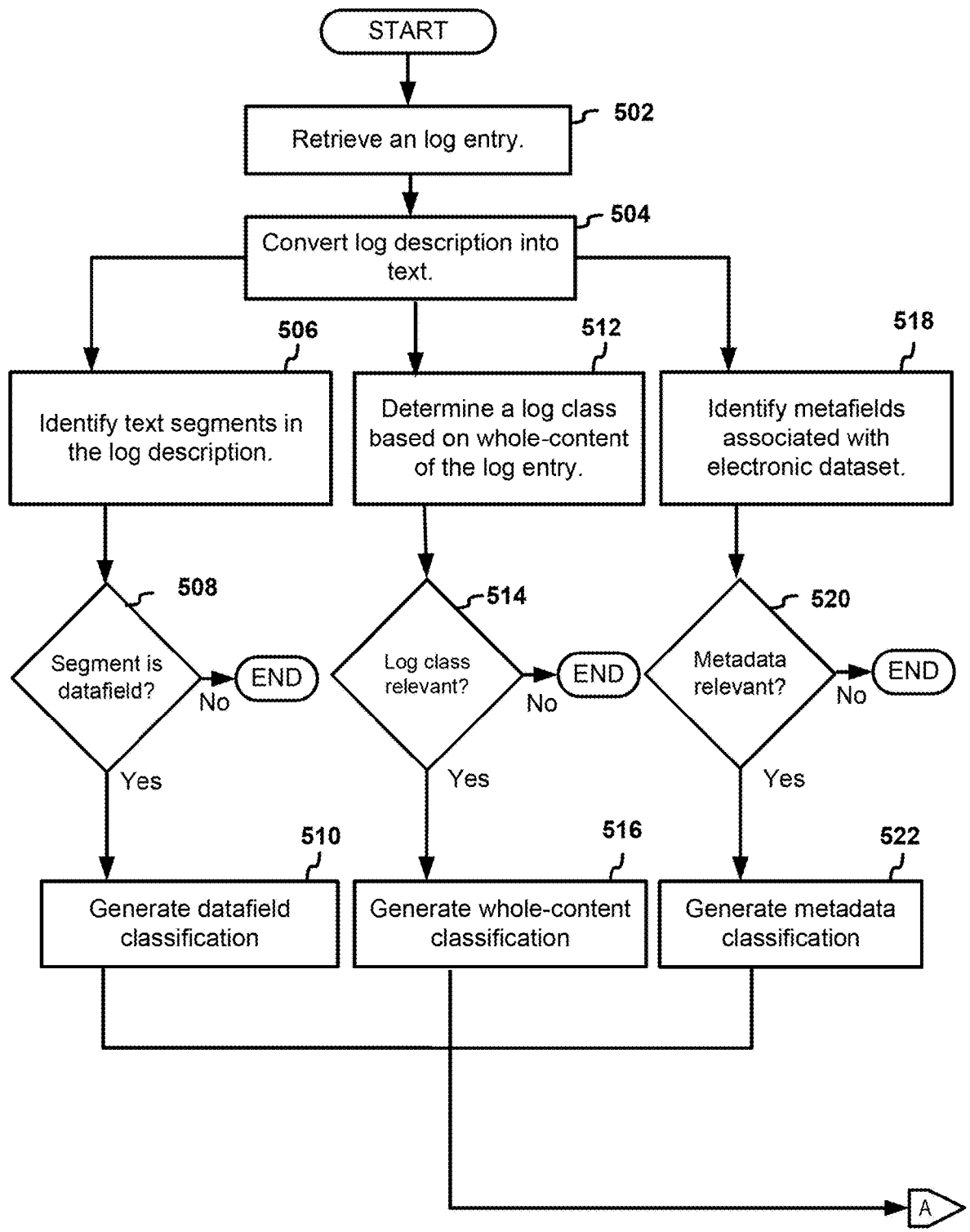
FIG. 5A-B illustrates a flow logic of a system.
Figure 5B:
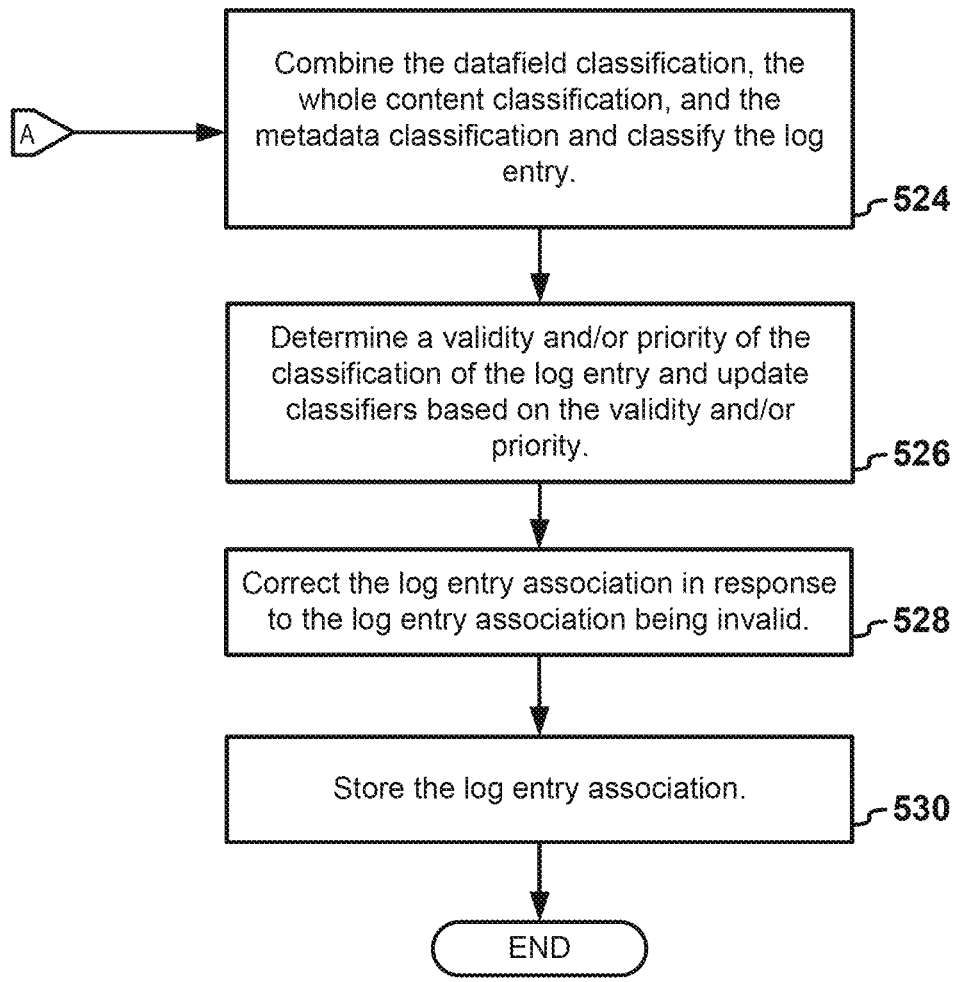

FIG. 5A-B Illustrates flow logic of the system 100. Referring to FIG. 5A, when the system 100 starts, the system 100 may retrieve the log entry 102 (502). For example, the system 100 may retrieve the log entry 102 from a memory, such as the database 136. The log entry 102 may include the metadata 120 and the log description 114. The system 100 may convert the log description 114 into text (504). For example, the system 100 may apply optical character recognition to an image file to generate the text. In some examples, the system 100 may extract images from the log entry 102. The system 100 may then proceed to analyze the log description 114 of the log entry 102 (see 506-510), analyze the whole-content 123 of the log entry 102 (see 512-516), and analyze the metadata 120 of the log entry 102 (see 518-522) in parallel (as shown in FIG. 5A) and/or in series.

As the system 100 beings to analyze the log description 114 for the log entry 102 (506-510), the system 100 may identify text segments 116 in log description 114 (506). For example, the text classifier 102 may segment the text of the log description 114 into the text segments 116. The text classifier 125 may identify text segments 116 of the log entry 102 associated with the indicators 204 of the word model 206. In some examples, the indicators 204 of the word model 206 comprise the datafield indicators 208 and the non-datafield indicators 210. The system 100 may determine that the text segment is the datafield 118 (Yes, step 508). For example, the text classifier 125 may determine that the text segment is the datafield 118 based on a confidence threshold. The text classifier 125 may determine that the text segment is the datafield 118 in response to the estimate being greater than the predefined threshold. Alternatively, the system 100 may determine that the text segment is not the datafield 118 (No, step 508). For example, the text classifier 125 may determine that the text segment is not the datafield 118 in response to the estimation being lower than a predefined threshold and processing may terminate.

The system 100 may generate the datafield classification 128 (510). The datafield classification 128 may include the datafield metrics 406. For example, the datafield classifier 302 may generate datafield classification 128 according to a statistical model in the datafield association predictor 312. The datafield metrics 406 may indicate respective accuracies of each categorical identifier in a group of categorical identifiers 108 representing the datafield 118. In some examples, the datafield classifier 302 may generate the datafield classification 128 in response to the text segment comprising the datafield 118. Additionally or alternatively, the datafield classifier 302 may compare the datafield 118 with previous associations in the datafield association history 314.

As the system 100 beings to analyze the whole-content 123 of the log entry 102 (512-516), the system 100 may determine a log class based on the whole-content 123 of the log entry 102 (512). The log class may indicate a classification based on the external classification scheme 104. The system 100 may determine whether the log class is relevant to the categorization scheme 106 (514). The relevance of the log class may be based on any condition when the whole-content 123 may be expected to be used in a classification or compared with any portion of the log entry 102 by any other classifier. In some examples, the system 100 may determine the log class based on a statistical analysis of the whole-content 123 of the log entry 102 and an association history of the log class of other log entries. For example, the system 100 may apply a statistical model to the whole-content and the association history to determine the log class and whether the log class is relevant. If the log class is relevant, the system 100 may generate the whole-content association metrics and the system 100 may update the association history based on the association feedback 140. When the log class is not relevant (No, 514), the process may end. For example, the system 100 may end the process in response to the log class not matching a predefined set of relevant log classes. When the log class is relevant (Yes, 514), the analysis of the whole-content may proceed.

The system 100 may generate the whole-content classification 320 (516). For example, the whole-content classification 320 may include the whole-content metrics 408. The whole-content classifier 304 may receive the whole-content 123 of the log entry 102. The whole-content classifier 304 may generate whole-content classification 320 according to the whole-content association predictor 322. The whole-content association predictor may apply the whole-content 123 of the log entry 102 to a statistical model included in the whole-content association predictor 322. Alternatively or in addition, the whole-content classifier may compare the whole-content 123 of the log entry 102 to previous whole-content classifications. The whole-content association history 315 may include the whole-content of previous log entries which correspond to previous whole-content classifications.

As the system 100 begins to analyze the metadata 120 of the log entry 102 (518-522), the system 100 may identify the metafields associated with the log entry 102 (518). For example, the log entry 102 may include the metafield 122. The metafield 122 may be stored in a database and/or received from a terminal. Alternatively or in addition, the system 100 may determine that a portion of the log entry 102 qualifies as the metafield 122. For example, the system 100 may include data models of historical metadata determinations. The system 100 may apply a statistical model to the historical determinations and the portion of the log entry 102 to determine that the portion qualifies as metadata. In some examples, the system 100 may receive images from the log entry 102 and determine, using image recognitions process as described herein, that the images qualify as the metafield 122.

The system 100 may determine the metafield 122 is relevant to the datafield 118 and/or log entry 102 (Yes, 520). For example, the system 100 may determine that the metafield 122 validates the datafield 118 and/or log entry 102. Relevance of the metafield 122 may be based on previous relevance determinations and/or other rules based on statistics and/or commercial practices. Additionally or alternatively, the relevance of the metafield 122 may be based on any condition when the metafield 120 may be expected included with the log entry 102, associated with the categorical identifier 108, and/or compared with other classifications. In some examples, system 100 may determine that the metadata is not relevant (No, 520) and processing may terminate. For example, the system 100 may determine that the metafield 122 is not relevant when the metafield 122 invalidates the datafield 118 and/or the log entry 102. In some examples, the system 100 may determine that the metafield 122 is included in a blacklist repository and/or a whitelist repository. The blacklist repository may include the metafield 122 and/or an association between the metadata and other information, such as the datafield 118 or the log entry 102 that invalidate the log entry 102. The white list repository may include the metafield 122 and/or an association between the metadata and other information, such as the datafield 118 or the log entry 102 that validates the log entry 102. The system 100 may end the process if the system 100 determines that the metafield 122 invalidates the datafield 118 and/or the log entry 102.

The system 100 may generate the metadata classification 324 (522). For example, the metadata classification 324 may include the metafield metrics 410. The metafield classifier 306 may generate one or more metadata classification 324 according to a statistical model in the metadata association predictor 326. The metafield metrics may include respective accuracies of one or more categorical identifier in a group of categorical identifiers 108 representing the metafield 122 of the log entry 102. For example, the metafield classifier 306 may generate respective accuracies for the metafield 122 of the log entry 102 that each categorical identifier in the group of categorical identifiers 108 is representative of the metafield 122. In some examples, the metadata association predictor 326 may compare the metafield 122 to other metafields associated with previous metadata classifications. The previous metadata classifications may include previously established associations between metafields and categorical identifiers 108.

Referring to FIG. 5B, the system 100 may combine the datafield classification 128, the whole-content classification 320, and the metadata classification 324 and classify the log entry 102 (524). For example, the combination classifier 132 may combine the output of datafield classifier 302, the whole-content classifier 304 and the metafield classifier 306. For example, the combination classifier 132 may calculate one or more combined classification 412 by combination of the datafield metrics 406, the whole-content metrics 408, and the metadata metrics 412. The combined classification 412 may include a modified metric of a respective categorical identifier in the group of categorical identifiers 108 being representative of the datafield 118. In addition, the combination classifier 132 may select one of the modified metrics with the highest confidence. For example, the combination classifier 132 may receive the datafield classification 128, whole-content classification 320, and/or the metadata classification 324. The combination classifier 132 may apply weight values to the datafield classification 128, the whole-content classification 320, and/or the metadata classification 324 and form a weighted datafield association. The combination classifier 132 may select one of the categorical identifiers 108 as being representative of the datafield 118 based on the weighted datafield association. In some examples, the weighted datafield association may include weighted metrics. The combination classifier 132 may identify one of the weighted metrics with a highest confidence and generate an association between the respective categorical identifier corresponding to the one of the weighted metrics and the log entry 102.

The system 100 may determine a validity and/or priority of the classification of the datafield 118 and update the classifiers based on the validity and/or priority (526). For example, the feedback controller 138 may apply the rules 110 of the categorization scheme 106 to the log entry association 134 and determine the validity of a mapping between the log entry 102 and the categorical identifier 112. In some examples, the feedback controller 138 may generate the association feedback 140. The association feedback 140 may be indicative of a validity and/or priority of any estimation and/or metric made by the system 100. For example, the association feedback 140 may be indicative of the validity and/or priority of datafield qualifications determined by the text classifier 125. The association feedback 140 may further include information descriptive of a priority of a specific attribute. Alternatively or in addition, the association feedback 140 may be indicative of the validity and/or priority of the metrics produced by the multiclass classifier 126 and/or the combination classifier 132. As described herein, the association feedback 140 may include any relevant information that was used to generate the log entry association 134, including, for example, the output from the text classifier 125, the multiclass classifier 126, and/or the combination classifier 132. The feedback controller 138 may communicate the association feedback 140 to each classifier. Alternatively or in addition, the feedback controller 138 may update each component of the multiclass classifier 126. Alternatively or in addition, the association feedback 140 may indicate the priority of the datafield 118 and/or metafield 122 with respect to a previous or future log entry associations and any related datafields and/or metafields associated with the log entry associations.

The system 100 may correct the log entry association 134 in response to the log entry association being invalid (528). For example, feedback controller 138 may determine a correct log entry association based on the rules 110 of the categorization scheme 106. The feedback controller 138 may update the log entry association 134 by associating the correct categorical identifier with the datafield 118. In another example, the system 100 may filter out statistically unusable attributes. The statistically unusable attributes may include, for example, an attribute having a low prediction, an attribute having similarities with other attributes, an attribute for which data is missing more than a threshold number of business entities, an attribute for which data is skewed more than a threshold level, and an attribute beyond the number of attributes that want to be included. Yet in another example, using business judgment, any redundant attributes or any attributes with high attribute importance values may be excluded. Either way, the removal of attributes based on rules or business judgment may improve the quality of prediction and processing speed.

The system 100 may store the log entry association 134 (530). For example, the system 100 may store the datafield 118, the categorical identifier 112 associated with the datafield 118, or IDs that are indicative of the datafield 118 and/or the categorical identifiers 108. The log entry association 134 may be stored in the database 136.

The logic illustrated in FIGS. 5A-B may include additional, different, or fewer operations. In addition, portions of the logic, such as 506-510, 512-516, and/or 518-522 may be performed in parallel and/or in series.

Figure 6:
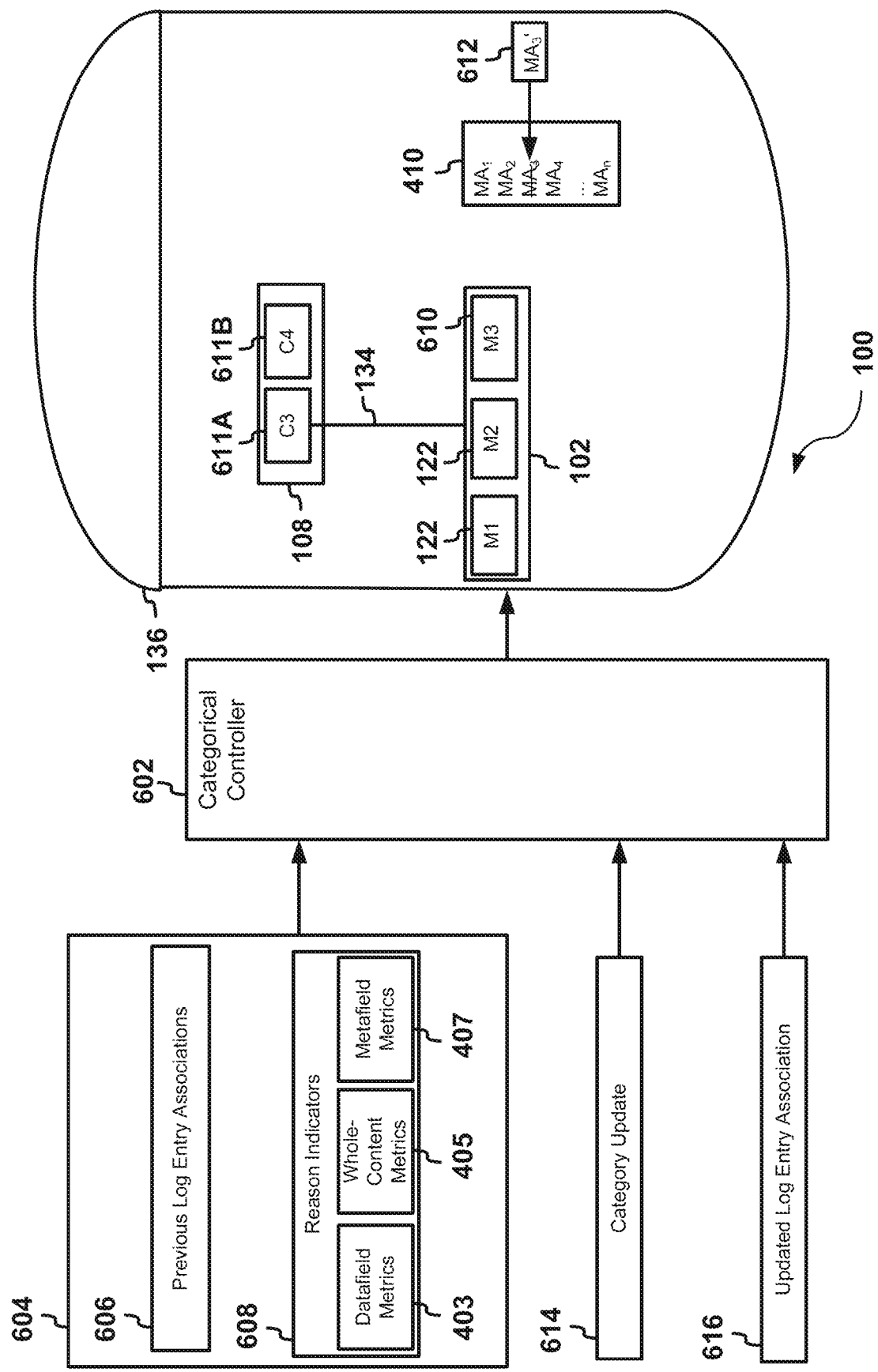
FIG. 6 illustrates an example of a categorical controller.

FIG. 6 illustrates an example of a categorical controller 602. The categorical controller 602 may perform self-learning by processing log entry associations, association feedback 140, and other output generated by the system 100.

The categorical controller 602 may receive classification information 604. The classification information 604 may include any categorization and/or information that was used as a basis of a categorization. For example, the classification information 604 may include previous log entry associations (the previous associations) 606 and/or reasoning indicators 608 for the previous associations 606. The previous associations 606 may include any association between log entries and categorical identifiers 108 as described herein. For example, the previous associations 606 may include the log entry association 134. The reasoning indicators 608 may include any information that was generated when establishing the previous associations 606. For example, the reasoning indicators 608 may include the datafield metrics 406 the whole-content metrics 408, and/or metafield metrics 410 that were used to determine the previous associations 606. Alternatively or in addition, the reasoning indicators 608 may include the association feedback 140 (FIGS. 1B and 2) generated by the previous associations 606.

Based on the categorization information 604, the categorical controller 602 may identify an outlier metafield 610 of the log entry 102. The outlier metafield 610 may include any metafield of the log entry 102 associated with metafield metrics 410 that include a statistical outlier compared with the metafield metrics 410 of other metafields in the log entry 102. For example, the metafield metrics 410 of the outlier metafield 610 may be greater or lower than a predefined influence value. In other examples, the metafield metrics 410 of the outlier metafield 610 may include a statistical variance compared the metafield metrics 410 of other metafields associated with the log entry 102.

The categorical controller 602 may identify the outlier metafield 610 based on the classification information 604. For example, the metafields of the log entry 102 may influence the metafield mapping 126 based on respective metafield metrics 410 associated with the metafields. The metafield metrics 410 may correspond to a respective categorical identifier of the group of categorical identifiers 108 and provide a metric indicative of the respective categorical identifier representing the metafield 122. The categorical controller 602 may determine that the metafield 122 is the outlier metafield 610 in response to all or a portion of the metafield metrics 410 being less than a predefined influence value. Alternatively or in addition, the categorical controller 602 may determine that the metafield 122 is the outlier metafield 610 in response to all or a portion of the metafield metrics 410 being greater than a predefined influence value. In some examples, the categorical controller 602 may calculate a variance of the metafield metrics 410 between a first metafield and a second metafield. The categorical controller 602 may identify the outlier metric 610 in response to the variance of the metafield metrics 410 being greater and/or less than the predefined influence value.

The predefined influence value may include any predetermined value that indicates a statistical threshold to establish outliers in the metafield metrics 410. For example, the predefined influence value may include the highest acceptable metric and/or a lowest acceptable metric. In other examples, the predefined influence value may include an indication of statistical variance. The categorical controller 602 may use the predefined influence value to identify the outlier metafield 610.

In some examples, the categorical controller 602 may identify a plurality of outlier metafields. The categorical controller 602 may determine corresponding text in the plurality of outlier metafields. For example, the categorical controller 602 may determine whether text of a first outlier metafield matches text of a second outlier metafield. The categorical controller 602 may, in response to detection of the corresponding text, suggest a new categorical identifier. The new categorical identifier may include, for example, the second categorical identifier 611B. In some examples, the categorical controller 602 may generate a description for the categorical identifier that includes text from the outlier metafields. For example, the categorical controller 602 may populate a template to include the text of the outlier metafields. The template may include predefined text arranged to display the predefined text with the text of the outlier metafield. The categorical controller 602 may communicate with a display interface to display a suggestion indicator in response to detecting the matching text in the outlier metafields. For example, the display interface may include a table that lists the plurality of outlier metafields. Alternatively or in addition, the display interface may include a graph that displays the outlier metafields and/or the metafield metrics 410 of the outlier metafields. The graph may indicate the suggestion indicator. The suggestion indicator may include, for example, a circle around clusters of outlier metafields on the graph. The suggestion indicator may also include suggestions to use certain outlier metafields for various purposes. In some forms of the present disclosure, the outlier metafields may be used to perform clustering.

Alternatively or in addition, the categorical controller 602 may identify a new categorical identifier for the log entry 102 based on the detection of the outlier metafield 610. For example, the log entry 102 may be mapped to a first categorical identifier 611A. The categorical controller 602 may generate a test metric for the outlier metafield 610 of the log entry 102. The test metric may indicate an accuracy value indicating an association between the outlier metafield 610 and a second categorical identifier 611B. The categorical controller 602 may communicate, with a display interface, a link indication between the outlier metafield and the second categorical identifier 611B in response to the test metric exceeding a second predefined influence value. A user may observe the link between the outlier metric and the second categorical identifier 611B and desire to remap the log entry 102. Accordingly, the categorical controller 602 may receive form the display interface a category update 614 and/or an updated log entry association 616.

The category update 614 may include a modification to the categorical identifiers 108. For example, the category update 614 may include an addition to the categorical identifiers 108. Alternatively or in addition, the category update 614 may include a deletion of one or more categorical identifiers 108. In some examples, the category update 614 may be communicated to the categorical controller 602. For example, the category update 614 may be generated in response to receiving a new category from a display interface.

The categorical controller 602 may update the categorical identifiers 108 in response to the category update 614. For example, the categorical controller 602 may add a new categorical identifier to the categorical identifiers 108. For example, the new categorical identifier may be communicated to the categorical controller 602 and/or received from the display interface. The categorical controller 602 any update any data structures that are affected by the category update 614. For example, the categorical controller 602 may update the database 136 to include a new categorical identifier.

The categorical controller 602 may update any classification history that may be affected by the category update 614. For example, the categorical controller 602 may update the metrics of the datafield classification 128, the whole-content classification 320, and/or the metafield classification 324 to reflect the categorical identifiers 108 after the update. Alternatively or in addition, the categorical controller 602 may signal the multiclass classifier 126 (FIG. 1B) to update corresponding association histories, for example the datafield association history 314, the whole-content association history 315, and/or the metafield association history 325, (FIG. 3) based on the category update 614. In other examples, the categorical controller 602 may initiate a re-mapping of log entries in response to category update 614. For example, the categorical controller 602 may insert the new categorical identifier into the categorical identifiers 608 and signal the multiclass classifier 126 and/or combination classifier 132 to re-generate the datafield classification 128, the whole-content classification 320 the metadata classification 324, and/or the combined classification 412. In one example, the metafield classifier 306 may generate new metadata metrics for the metafields of the log entry 102 in response to the category update 614. In addition, the combination classifier may generate a new datafield association. The new datafield association may be based on updated metrics that account for the category update 614 whereas the original datafield association did not.

The updated log entry association (the updated association) 616 may include an update made to an association between log entries and categorical identifiers 108. For example, the updated association 616 may include a remapping of the log entry 102 from the first categorical identifier 611A to the second categorical identifier 611B. The updated association 616 may be communicated to the categorical controller 602. For example, a display interface may receive an indication to remap the log entry 102 to the second categorical identifier 611B.

In response to the updated association 616, the categorical controller 602 may remap the log entry 102 corresponding to the updated association 616 from the first categorical identifier 611A to the second categorical identifier 611B. In some examples, the updated association 616 may impact future log entry associations because the metadata metrics 410 corresponding to the updated association 608 may be out of date and/or no longer accurate in view of the updated association 616. The categorical controller 602 may update the metadata metrics 410 for the metafields to create updated metadata metrics. In addition, the categorical controller 602 may identify other log entries that also include the metafields affected by updated association 616. The categorical controller 602 may reweigh the datafield metrics, the updated metadata metrics, and the whole-content metrics to generate updated weighted metrics. The updated weighted metrics may be used to establish the log entry association 102, as described herein.

In some example, the categorical controller 602 may update metrics stored in the database 136 in response to the category update and/or the updated association 616. For example, the categorical controller 602 may generate an updated metric 612 in response to updated association and/or category update 614. As illustrated in FIG. 6, the updated metric 612 may be indicative of the metafield 122 representing a first categorical identifier 611A. The updated metric 612 may replace the previous metadata metric of the metafield metrics 410. For example, as illustrated in FIG. 6, the updated metric 612 designated $MA_3'$ may correspond to the first categorical identifier 611A designated C3. The updated metric 612 may replace the metadata metric designated $MA_3$. In other examples, the updated metric may correspond to any other type of metric described herein. For example, the updated metric may correspond to the datafield metrics 406, the whole-content metrics 408, and the weighted metrics.

The categorical controller 602 may communicate with a display interface (not shown in FIG. 6) to display the categorical information 604. In addition, the categorical may communicate with the display interface to illustrate receive the category updates 616 and/or the updated associations 616. For example, the display interface may display the categorical identifiers 108, the log entry 102, the metafield 122, the outlier metafield 610, the datafield metrics 403, the whole-content metrics 405, the metafield metrics 407, and any other information related to the log entry 102 and/or the log entry association 134. In some examples, the graphical interface may display relationships between subcomponents of the log entry 102. For example, the display interface may display a link between the outlier metafield 610 and the metrics used to determine the outlier metafield 610. In one example, the display interface may display metadata metrics greater and/or less than a predefined threshold that were used to determine the outlier metafield 610.

Alternatively or in addition, the categorical controller 602 may receive criteria used to identify one or more log entries and/or metafields. Examples of the criteria may include a categorical identifier, text, or metrics. For example, the categorical controller 602 may receive criteria indicative of the first categorical identifier 611A. In response to the criteria, the categorical controller 602 may identify some or all of the log entries mapped to the first categorical identifier 611A. In addition, the categorical controller 602 may identify some or all of the metafields associated with each of the log entries mapped to the first categorical identifier 611A. The categorical controller 602 may identify the metafields with metadata metrics exceeding the predefined influence value. In addition, the categorical controller 602 may display the metafields and/or the log entries on a display interface.

Embodiments of systems and methods described herein may be deployed and implemented in a number of ways to produce useful categorization results. For example, embodiments of the invention can be implemented using closed loop implementation, such as a closed loop controller.

Figure 7A:
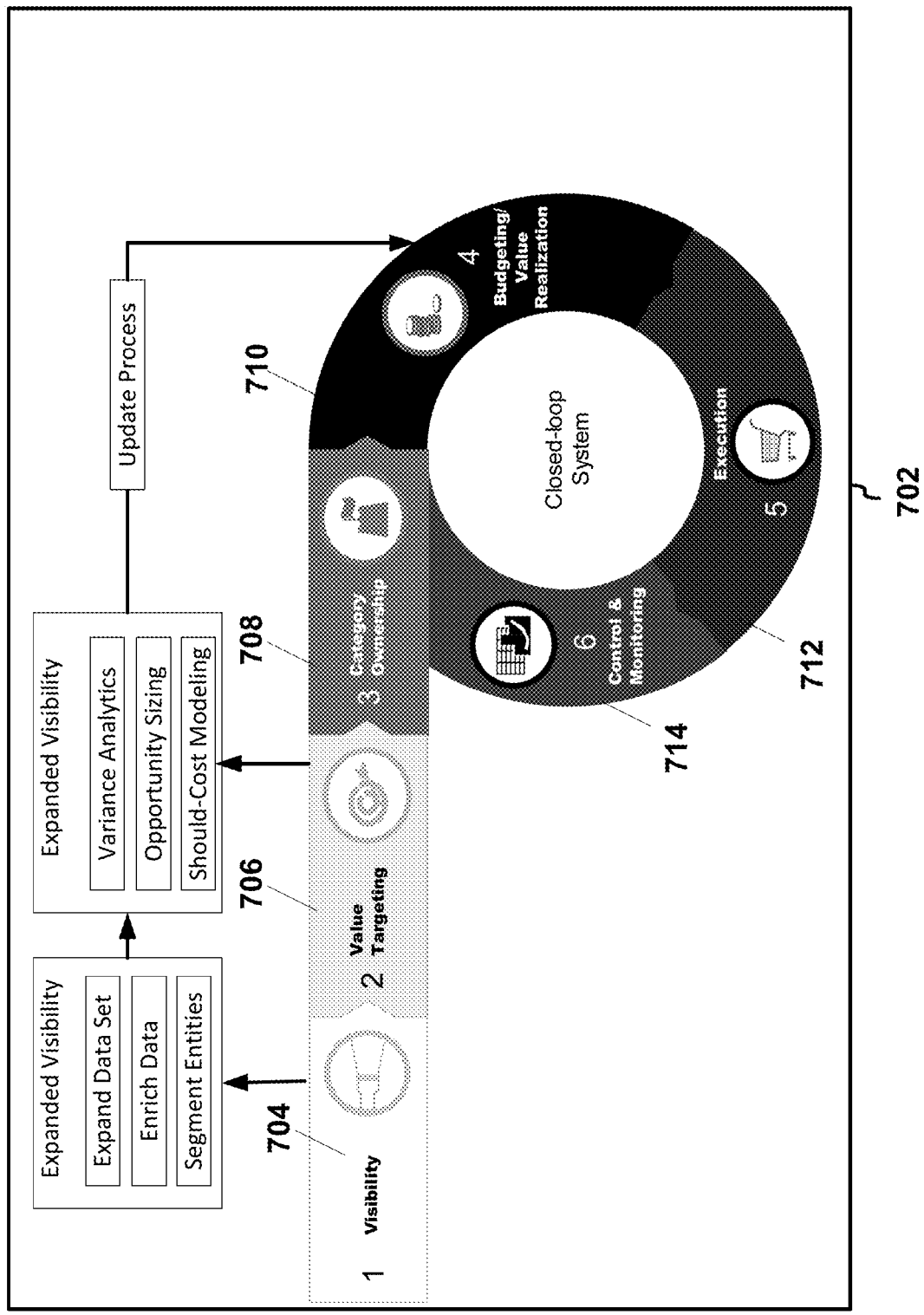
FIG. 7A-B illustrates an example of a closed loop controller.
Figure 7B:
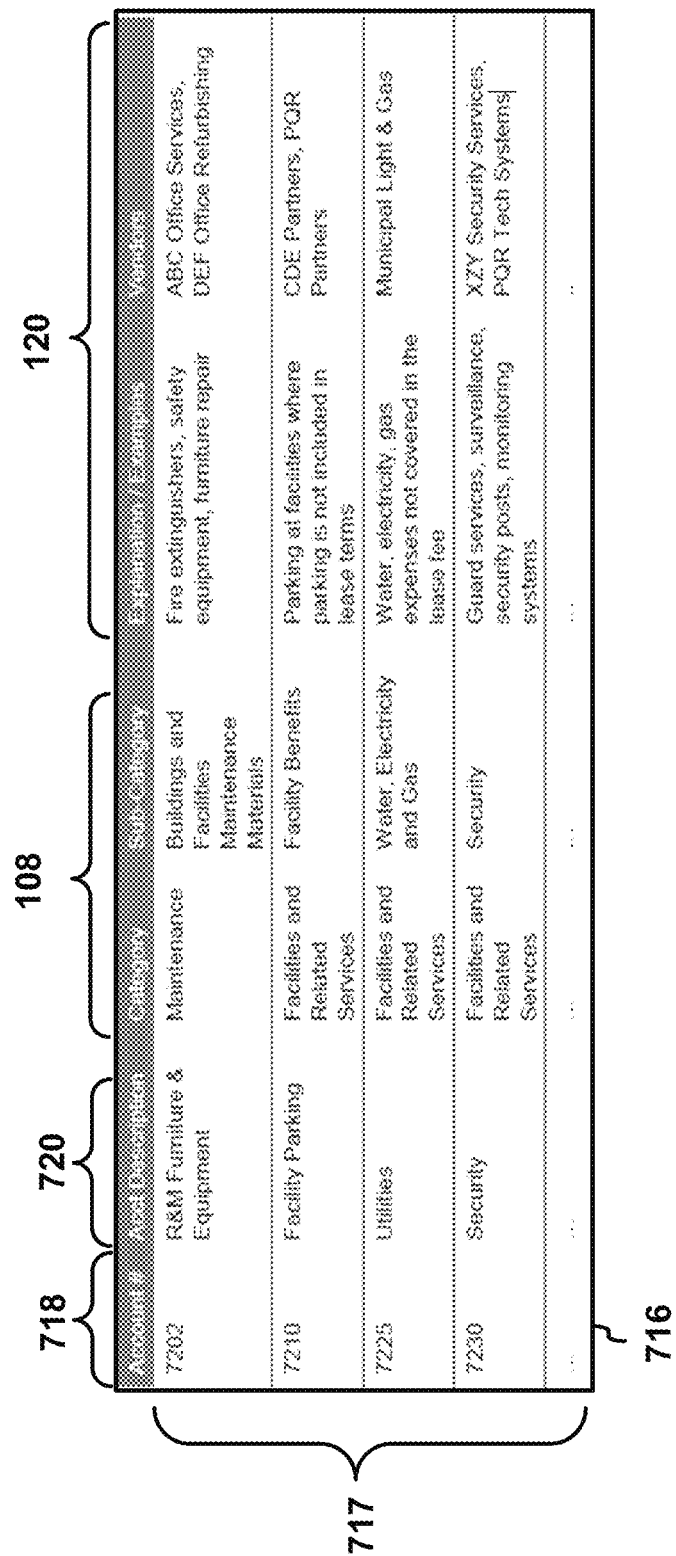

FIG. 7A-B illustrates an example of a closed loop controller 702. Referring to FIG. 7A, the closed loop controller 702 may objectively characterize an allocation and consumption of resources within an enterprise over predefined periods, such as days, weeks, months, years, etc. In addition, the closed loop controller 702 may objectively identify inefficiencies associated with the allocation and consumption of resources and may further adaptively reallocate resources to reduce and/or minimize one or more impacts of the identified inefficiencies. For example, the closed-loop controller (the controller) 702 may be included in a zero-based budgeting system, zero based spend system, etc.

The controller 702 may include stages or phases, such as a visibility stage 704, a value targeting stage 706, a category ownership stage 708, a zero-based budgeting stage 710, a source to pay execution stage 712, and a control and monitoring stage 714. The visibility stage 704 may include a computer-implemented functionality for extracting a log history from external systems and creating a consistent mapping of the log history between the external system and a standardized model. The visibility stage 704 of the controller 702 may acquire and organize the log history according to standardized models, such as the categorization scheme 106 and prepare the data for subsequent stages of the controller 702. For example, the controller 702 may receive a general ledger, account payable, and purchase order data and request additional data, for example, accounting policies, foreign currency exchange tables, classification models, formatting rules, and/or other information available from the external system. In some forms of the present disclosure, the visibility stage 704 may be expanded to include more data sets describing each of the physical segments of a business entity or organization. For example, additional data sets for each of a number of different store locations may include volume data, consumption data, attribute data for each type of spend, driver data for each type of spend, and the like, in addition to spend data. As such, additional data form both internal and external sources may be integrated into a single database. In an example, the visibility stage 704 may be expanded by enriching data such as by using drivers related to operation of the physical segments. For example, in the case of different store locations, the drivers may include store selling area, parking lot size, store revenue, number of products sold, number of customers. The drivers may be used in order to determine and generate equalized comparisons of business entities of different sizes. Yet in another example, the visibility stage 704 may also be expanded by performing an attribute selection/prioritization in relation to the selection criteria 416 discussed above, and performing clustering that is also discussed elsewhere, including in connection with FIG. 9. For example, business entities may be grouped into segments using the attribute data. The expanded visibility may be useful for business entities with multiple locations having varied operational aspects. In particular, expanded data sets may encompass unique identifying attributes of some of the business entities. The visibility stage 704 may provide a data profile based on the external classification model 104 of the external system. In some examples, the visibility stage may make use of the system 100. For example, the visibility stage 704 may categorize the information provided by the external system based on the log description 114 and/or the metadata 120 of one or more of the log entry 102, as described herein. The output from the system 100 may be analyzed by the category ownership stage 708, the zero-based budgeting stage 710, the source to pay execution stage 712, and the control and marketing stage 714.

The value targeting stage 706 may include functionality for identifying drivers based on the log history acquired and/or categorized in the visibility stage. In addition, the value targeting stage 706 may identify target policies for the categories of the categorical identifiers 108. The drivers may include circumstances that caused the events corresponding to the log history. In one example, the event may include the transportation of resources. The drivers may include the demand of the resources, the shipping requirements of the resources, the lead time of producing the resources, the distance the resources are shipped and any other information related to the transportation of the resources. In another example, the value targeting stage 706 may include generating event models to quantify the log history and identify efficiencies and/or inefficiencies in the log history. Alternatively or in addition, the value targeting stage 706 may identify targets policies for categories corresponding to the categorical identifiers 108. The target policies may include a modification to policies that caused the events in one or more of the categories. For example, the target policies may include the amount of resources to procure or expend in anticipated events that may arise in subsequent periods. Segmenting business entities into clusters based on those selected attributes using machine learning models in the visibility stage 704 may enable the value targeting stage 706 to be performed within each cluster with different rules.

In some forms of the present disclosure, various analytics such as variance analytics, opportunity sizing, and should-cost model may be used in the value targeting stage 706. In the variance analytics, for each segment, the outlier may be identified from the distribution of business entities around the mean value of that segment. For example, business entities with extreme values on either side of the median may be considered outliers, and median values and distribution around the median may vary across segments. As an alternative to Mean and Standard Deviation, Median and Interquartile Range (IQR) may be used to analyze the variance of a normalized metric. The IQR may be ideal for skewed data, whereas the Mean and Standard Deviation may be ideal for symmetrical numerical data. Also, the IQR may not be affected by extreme values, and may still be used as a measure of variability even if extreme outliers may not be quantified. The IQR may also be used for ordinal data as well.

In the opportunity sizing, targets may be set for all or any entities within each segment leading to a potential reduction opportunity. In particular, within each segment, targets for outliers in each segment for the normalized metric may be set. In one example, targets for business entities both above and below median may be set to a level that is closer to the median, resulting in both an increase and a reduction for outliers (e.g., business entities in the $1^{st}$ and $4^{th}$ quartile may be set to median). In another example, targets for business entities that are above the median may be set to a level that is lower, resulting in a reduction for outliers (e.g., business entities in the $4^{th}$ quartile may be set to the median or the $1^{st}$ quartile limit). Once the targets have been set, the normalized metric may be converted back to resource allocation (e.g., spend, cost) using the driver. Nevertheless, any business judgment under certain circumstances (e.g., capping amount of increase or reduction) may override the target setting, such as applying rules differently for any or all segment and applying rules differently within each segment to select business entities.

In the should-cost modeling, after multiple cycles of the repeated setting of targets within each segment, variance across entities within that segment will gravitate toward the target. The should-cost model may be developed using equations built with the attributes. For example, coefficients for these attributes may have different values for each segment. As a result, prediction accuracy may be improved over time as data may be refreshed on an ongoing basis.

The category ownership stage 708 may include functionality for assigning responsibility of the implementation, management, and tracking of the target policies identified in the value targeting stage 706. For example, the categorical identifiers 108 may categorize the log history, as described herein. In addition, the target policies identified in the value targeting stage may be associated with the categorical identifiers 108 of the log history. The category ownership stage may assign the target policies to user account identifiers. Accordingly, users associated with the user account identifiers may be responsible for implementing, managing, and/or tracking the improvements. In some examples, the improvements may be associated with role identifiers. The role identifiers may be associated with the user account identifiers. Accordingly, users corresponding to a role identifier may be responsible for implementing, managing, and/or tracking the target policies assigned to the role identifier.

The zero-based budgeting stage 710 may include functionality for generating a budget starting from, for example, a zero-base. For example, the budget may initially be void of any of the events. The target policies may be applied to the budget. Accordingly, the budget may include events anticipated under the target policies in a subsequent period. In addition, the budget may include information for identifying the amount of resources that are expected to be procured and/or expended in the subsequent period. In some forms of the present disclosure, targets outputted from the value targeting stage 706 may be used in the zero-based budgeting stage 710. More specifically, the output may be used as an input into budgets as well as to revise forecasts. Additionally, the output may be used to automatically perform, including but not limited to the resource allocations (e.g., spend, cost, change quantities of stock ordered, working hours of staff, staff positions, allocation of tasks, and the like) and corresponding responsibilities. The targets may be used as the budget value or may be revised using any additional overlays, including the impact of ongoing initiatives, the impact of additional drivers, external factors such as future inflation or currency rates. The forecasts may also be updated on an ongoing basis over time as underlying data for each business entity is refreshed, and various analytics may be revised. In particular, the same segmentation selected in the visibility stage 704 may be used for all other future stages of the closed loop controller 702. The closed loop controller 702 may be used for different dependent variables (e.g., cost, spend, expenses, demand/consumption for labor or services, revenue, sales, risk of threat) as long as there are multiple business entities involved. Accordingly, if an attribute consumed or generated (e.g., cost, time, revenue, material, services) may be measured, the closed loop controller 702 may be utilized as a whole or broken down into its components. For example, the closed loop controller 702 may be used for the total labor cost of a store's organization or to track each activity that employees may perform. In another example, the closed loop controller 702 may break up a business entity's workflow into discrete activities, and then analyze labor hours consumed for each activity using a clustering approach, such as the example illustrated and discussed with reference to FIG. 10.

The source to pay execution stage 712 may include functionality for generating tasks associated with the target policies. The tasks may include actions required to realize the target policies. The tasks may be assigned a task identifier. The task identifier may be associated with the user account identifiers and/or role account identifiers. Alternatively or in addition, the task identifier may be associated with the categorical identifiers. The tasks may include negotiating new agreements between suppliers and consumers. Alternatively, the tasks may include adjusting the quality and/or quantity of resources procured and/or produced. In other examples, the tasks may include any action, operation, or event that will realize the target policies included in the budget.

The control and monitoring stage 714 may include functionality for identifying and tracking the information corresponding to log entries received after the budget has been established and comparing the log entries to the budget to highlight any variances along categorical identifiers 108 and/or metafield 122. Alternatively or in addition, the control and monitoring stage 714 of the closed loop control 702 may be used to identify the root-causes of and/or abnormalities in and/or risks due to and/or opportunities in any of the aforementioned variances. Identification of the root-causes, abnormalities, risks, or opportunities may be performed with respect to the budgets along any combination of datafields, metafields and/or categorical identifiers 108.

In some examples, the visibility stage 704 may output a categorized log 716 (FIG. 7B). For example, the categorized log 716 may be generated by the system 100. The categorized log 716 may include a log history categorized based on the categorization scheme 106. The categorized log 716 may be stored in the database 136, a datastore and/or another example of memory. For example, the categorized log may be output to a file that includes tables that display the categorized log 716.

Continuing with reference to FIG. 7B, the categorized log 716 may include one or more of the categorized log entries 717. The categorized log entries 717 may be related to, for example, transactions associated with the exchange of resources and/or assets. The categorized log entries 717 may include one or more of the log entry 102 that was categorized by the visibility stage 704.

The categorized log 716 may include third-party categories 718. The third-party categorized 719 may be defined by the third-party systems that classify categorized log entries 717 and/or the external classification scheme 104. The third-party categories 718 may be described by log descriptions 720. For example, as illustrated in FIG. 7B, the third-party categories 718 may include account numbers and the log descriptions 720 may include an account description. In other examples, the third-party categories 718 may include any classification under the external classification scheme 104 and the log descriptions 720 may include any example of the log description 114 described herein.

The categorized log 716 may include the categorical identifiers 108 including any underlying hierarchical sub-categorization identifiers. For example, the categorical identifiers may include identification of a category and a sub-category. In addition, the categorized log 716 may include metadata 120. The metadata 120 may provide additional context of the categorized log entries 717 included in the categorized log 716. Alternatively or in addition, the metadata 120 may include any example of the metafield 122, as described herein.

In some examples, it may be desirable to re-categorize the log entry 102 according to a standardized categorization model, such as the categorization scheme 106. Since the third-party categories 718 may be unknown or change over time, the log descriptions 702 may be used to categorize the log entries in a standardized manner. The categorized log entries 717 included in the categorized log may be categorized based on the log description 114 and context 124 of one or more log entry(s) 102. (FIG. 1A-1B) For example, the visibility stage 704 may generate the datafield metrics 406, whole-content metrics 408, and metadata metrics 410 for the log entry 102. (FIG. 4) The visibility stage 704 may combine the datafield metrics 406, whole-content metrics 408, and metadata metrics 410 to generate weighted metrics. (FIG. 4) The visibility stage 704 may generate one or more of the categorized log entries 717 based on the weighted metrics.

By way of another example with reference to FIGS. 1A-1B, 2 and 7A-B, the system 100 may be implemented as part of the visibility stage 704 of the close-loop controller 702. The system 100 may include the text classifier 125 that is executable by the processor to identify, according to the log format rule 201, a log description 114 of the log entry 102 and metafields of the log entry 102. The text classifier 125 may be further executable by the processor to determine that the log description 114 comprises a datafield 118 based on a comparison of the log description 114 with the datafield indicators 204 of the word model 206. For example, the text classifier 125 may be used to determine the datafield 118 from a segment of the log description 114.

Referring to FIGS. 3, 4 and 7A-B, the visibility stage 704 may further include the datafield classifier 302 executable by the processor to generate the datafield metrics 406 for the datafield 118. The datafield metrics 406 may correspond to a categorical identifier of the group of categorical identifiers 108. The datafield metrics 406 may include an accuracy and/or confidence and/or priority indication of the datafield categorization. The datafield categorization may include an association between the datafield 118 and a corresponding categorical identifier.

The visibility stage 704 may further include the metafield classifier 306 that is executable by the processor to generate the metadata metrics 410 for the metafields. The metadata metrics 410 may correspond to a categorical identifier of the group of categorical identifiers 108, the metadata metrics 410 may include an accuracy and/or confidence and/or priority indication of the metafield categorization. The metafield categorization may include an association between the metafield 122 and a corresponding categorical identifier;

The visibility stage 704 may further include the combination classifier 132 that is executable by the processor to apply weight values to the datafield metrics 406 and the metadata metrics 410 and to generate weighted metrics for the log entry 102. The weighted metrics may include an accuracy value of the log categorization. The log categorization may include an association between the log entry 102 and the corresponding categorical identifier.

The visibility stage 704 may generate a mapping between the categorical identifier 126 of the group of categorical identifiers 108 and the log entry 102 in response a weighted metric of the weighted metrics for the log entry 102 exceeding a predefined threshold.

Figure 8:
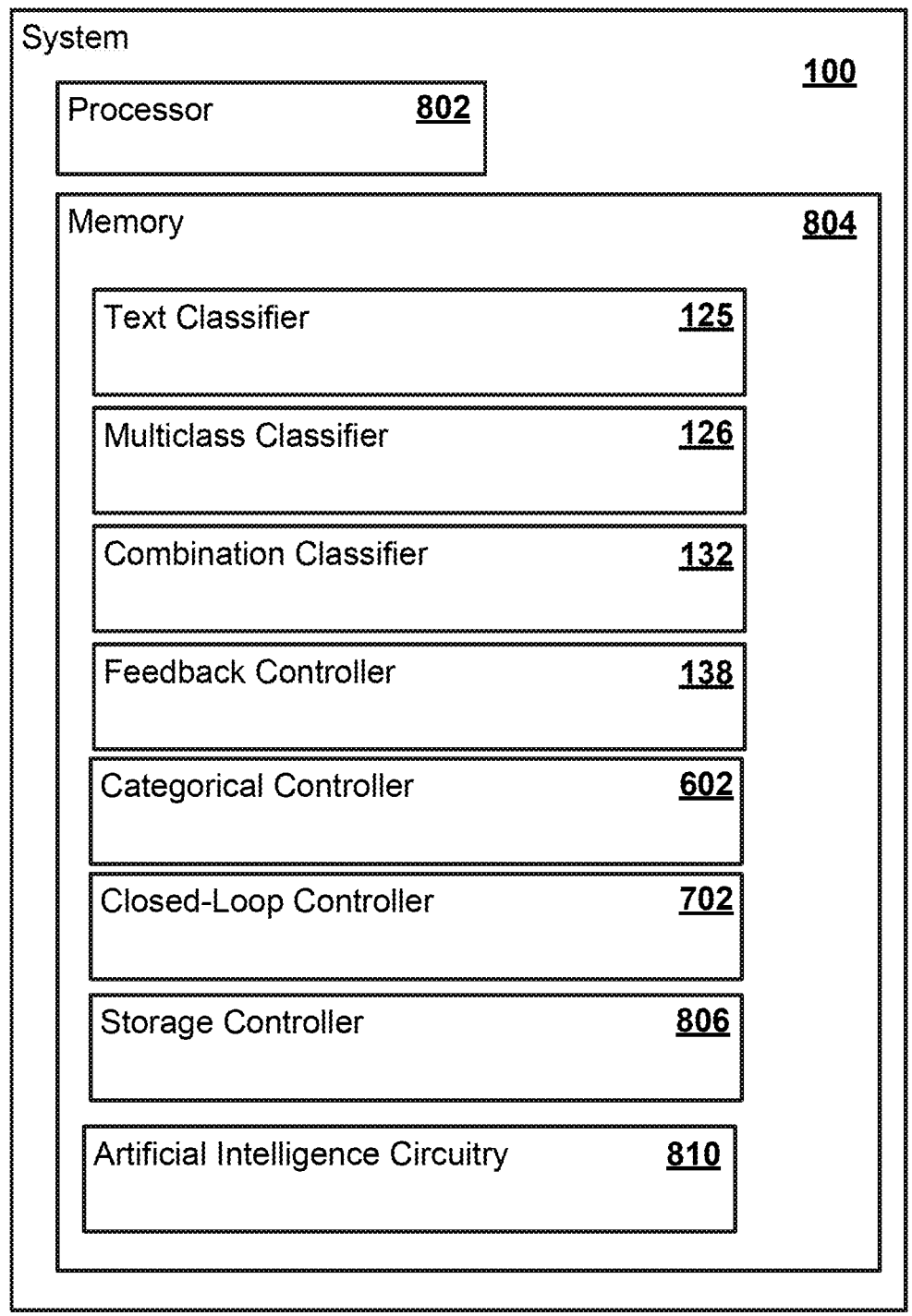
FIG. 8 illustrates an example of a system that includes a memory and a processor.

The system 100 may be implemented with additional, different, or fewer components than illustrated. For example, FIG. 8 illustrates an example of the system 100 that includes a memory 804 and a processor 802.

The processor 802 may be in communication with the memory 804. In one example, the processor 802 may also be in communication with additional elements, such as a network interface (not shown). Examples of the processor 802 may include a general processor, a central processing unit, a microcontroller, a server, an application specific integrated circuit (ASIC), a digital signal processor, a field programmable gate array (FPGA), and/or a digital circuit, analog circuit, or some combination thereof.

The processor 802 may be one or more devices operable to execute logic. The logic may include computer executable instructions, machine readable instructions, or computer code stored in the memory 804 or in other memory that when executed by the processor 802, cause the processor 802 to perform the features implemented by the logic of the text classifier 125, the multiclass classifier 126, the combination classifiers 132, the feedback controller 138, the categorical controller 602, the closed-loop controller 702, the storage controller 806 and/or the system 100. The computer code may include instructions executable with the processor 802. The datafield storage controller may include logic to store the association between the datafield 118 and one or more of the categorical identifiers 108.

The memory 804 may be any non-transitory device for storing and retrieving data or any combination thereof. The memory 804 may include non-volatile and/or volatile memory, such as a random access memory (RAM), a read-only memory (ROM), an erasable programmable read-only memory (EPROM), or flash memory. Alternatively or in addition, the memory 804 may include an optical, magnetic (hard-drive) or any other form of data storage device.

The memory 804 may include at least a part of the text classifier 125, the multiclass classifier 126, the combination classifiers 132, the feedback controller 138, and/or the storage controller 806. In addition, the memory may include any other component previously discussed, such as the word model 204, datafield qualifier 212, the datafield association history 314, the whole-content association history 315, the metadata association history 325, combiner model 404, selection criteria 410, and/or other components of the system 100 described herein.

Each component may include additional, different, or fewer components. For example, the multiclass classifier 126 may include the datafield classifier 302, the whole-content classifier 304 and the metafield classifier 306. Further, the text classifier 125 may include the feedback handler 216. In other examples, the feedback controller 138 may include the feedback handler 216.

Figure 9:
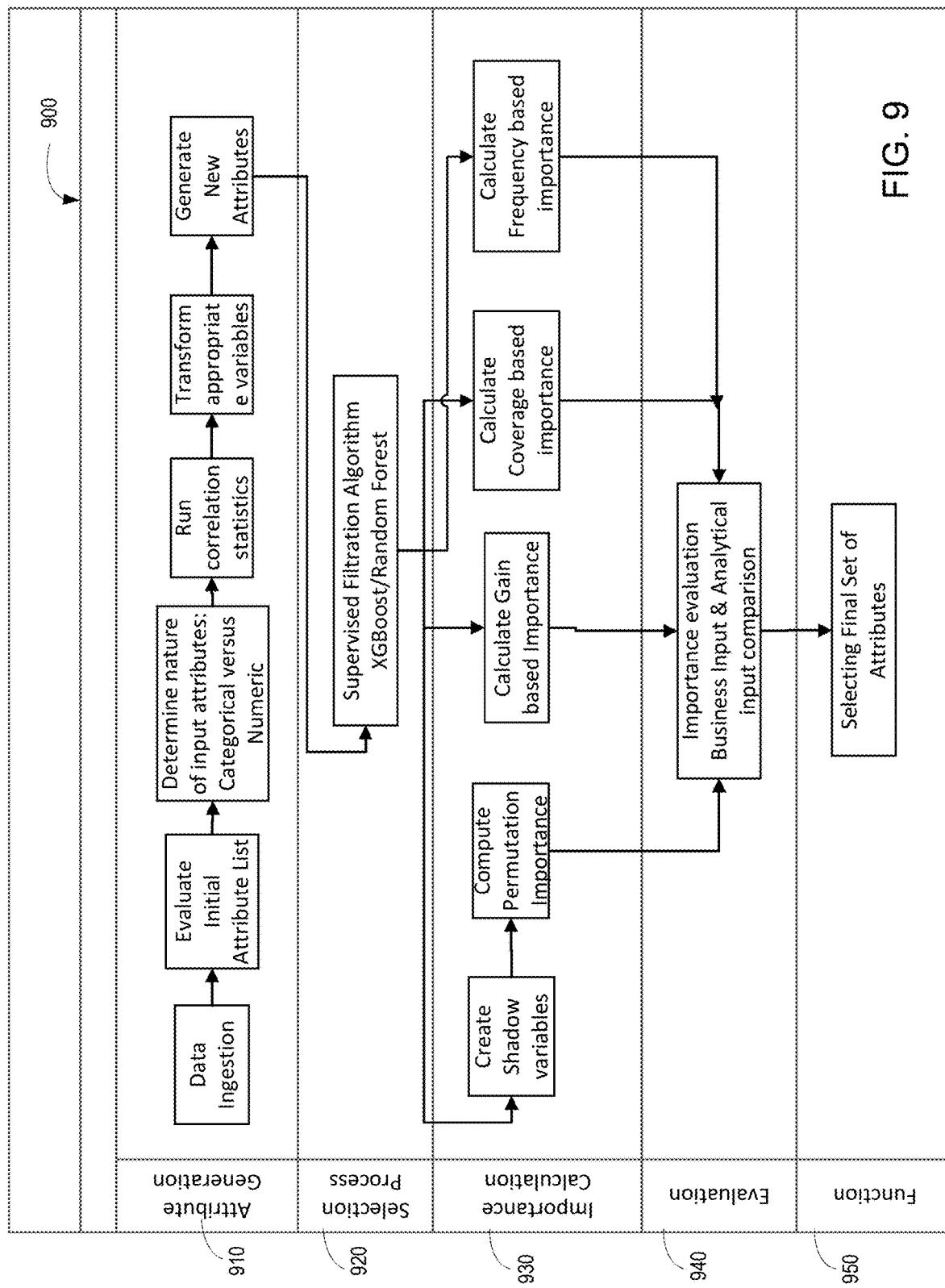
FIG. 9 illustrates a flow sequence of performing attribute selection.

FIG. 9 illustrates an example flow sequence of performing attribute selection 900 in some forms of the present disclosure.

At 910, the processor 802 may evaluate an initial attribute list using the received input data. Then, the processor 802 may determine the nature of attributes of the input data (e.g., categorical or numerical). The processor 802 may then generate a new list of attributes by running correlation statistics corresponding the nature of attributes of the input data, and transforming them into appropriate variables. In particular, a correlation check may be performed among all the input data variables to identify certain situations in which two or more explanatory variables are highly linearly related and exclude one of them. The correlation check may be also used to determine if a certain attribute has a direct and high bearing on the dependent variable, in which case it must be included in the model. Similarly, a variable transformation may be used to change the scale of values and/or to adjust the skewed data distribution to Gaussian-like distribution through some "monotonic transformation." This may ensure that the data has low variance and it is close to normally distributed around a mean. Otherwise, a transformation method may be applied. For example, a logarithmic transformation may be applied to smoothen variance of time series data with high variance in some months on account of seasonality. At 920, the attribute selection process may be performed by using machine learning models (e.g., XGBoost, GBM, Random Forest, or the like).

At 930, the processor 802 may calculate the attribute importance value of the attributes based on various factors (e.g., permutation importance, gain-based importance, coverage-based importance, frequency-based importance). The attribute selection 900 may choose to use the outcome from at least one of these metrics. The 'gain' may imply the relative contribution of the corresponding attribute to the model calculated by taking each attribute contribution for each tree in the model. A higher value of this metric, when compared to another attribute, may imply that it is more important for generating a prediction. The 'coverage' metric may indicate the relative number of observations related to this attribute. As an example, if there are 100 observations, 4 attributes and 3 trees, and Attribute1 may be used to decide the leaf node for 10, 5, and 2 observations in Tree1, Tree2 and Tree3, respectively. In this case, the coverage metric may count 'cover' for this attribute as 10+5+2=17 observations. This may be calculated for all the 4 attributes and the cover may be 17 expressed as a percentage for all attributes' cover metrics. The 'frequency' may be the percentage representing the relative number of times a particular attribute may occur in the trees of the model. The frequency for an attribute may be calculated as its percentage weight over weights of all attributes. Permutation importance may fall in the gain category. Shadow variables may be created by randomly changing the order of the variable and checking for model error. The one attribute that may cause the maximum error after changing the order may be ideally the most important. When XGBoost may be used as the filtering algorithm, it may use gain-based importance and may only report on coverage-based and frequency-based importance. At 940, even an attribute with a high attribute importance value may be excluded on a needed basis if a business judgment is applied, thereby narrowing down the most relevant attribute based on the attribute importance value, At 950, a final set of attributes may be selected.

Figure 10:
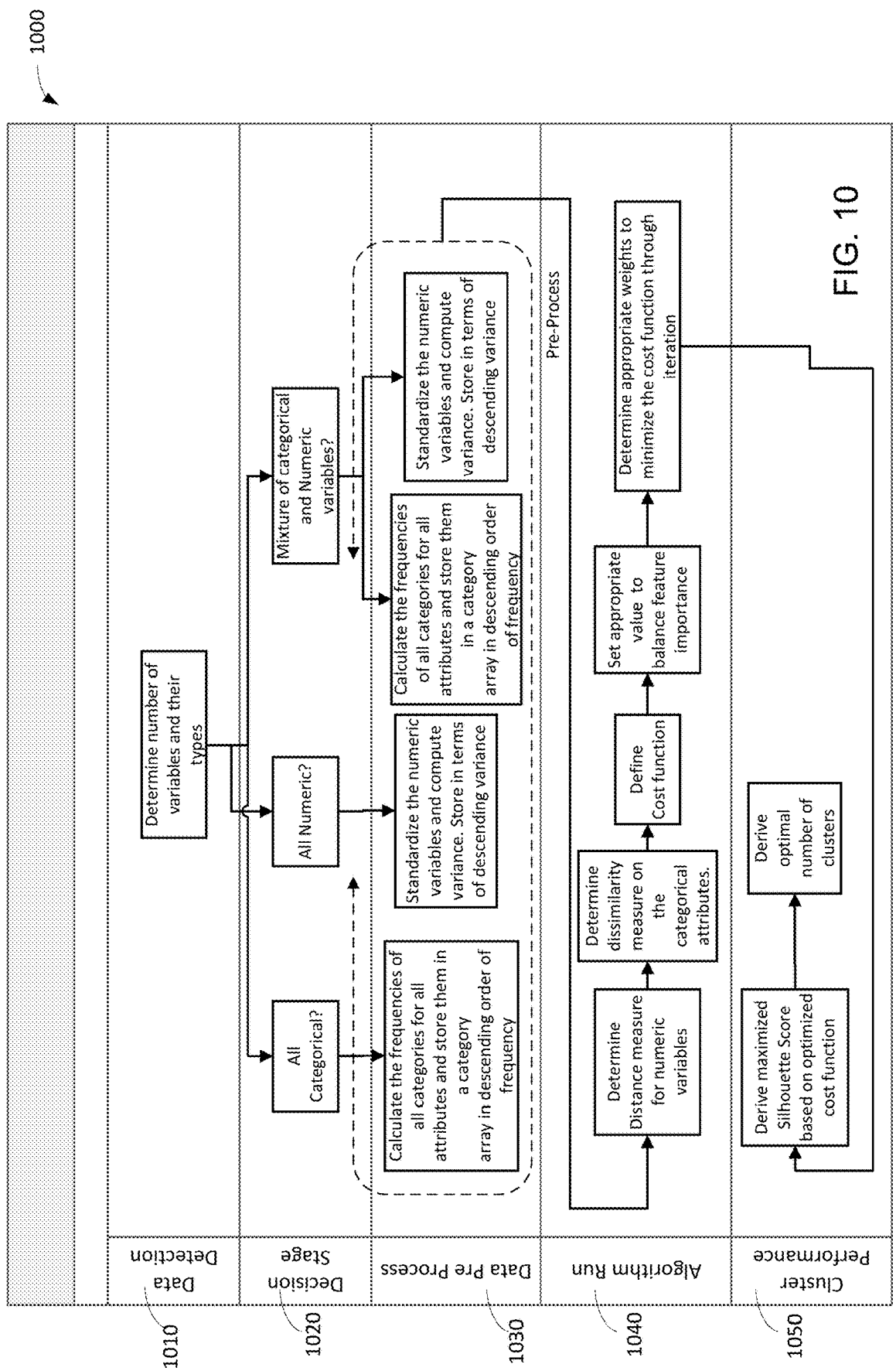
FIG. 10 illustrates a flow sequence of performing clustering.

FIG. 10 illustrates an example flow sequence of performing clustering 1000 in some forms of the present disclosure. After the log entry association is generated, the attribute selected in FIG. 9 may be used for performing clustering. The clustering may include grouping business entities into segments using the selected attribute.

At 1010, the processor 802 may determine the number of variables and their data types. At 1020, the processor 802 identifies the data type as to whether it is a categorical type, a numerical type, or a mixture of categorical and numeric types. Corresponding to the data type, different machine learning models may be selected at 1030 and 1040. For example, K-means model may not be run if the data type of the attribute is categorical. Here, different types of machine learning models (e.g., K-means, Partitioning Around Medoids (PAM), K-Prototype, and Hierarchical Clustering) may be operated. These clustering algorithms may process variables in the order of reducing variance. If a variable has a high variance, it may be processed first. The algorithm may stores the variables in the reducing order of variance as an interim step. Next, standardization may be used to bring the different variables to the same scale. Standardization may be of crucial importance if each variable in the data has a different unit of measurement (e.g., inches, pounds, kilograms, years), or where the scales of each variable are very different from one another (e.g., 0-1 vs. 0-1000). In cluster analysis, groups may be defined based on the distance between points in mathematical space. When each variable in the data may mean something different (e.g., age and weight), the fields may be not directly comparable. For example, one year in age may be not equivalent to one pound in weight and may or may not have the same level of importance in sorting a group of records. There may be situations where one field has a much greater range of values than another because the field with a wider range of values likely has greater distances between values. In such a case, it may end up being the primary driver of what defines clusters. Standardization may help to make the relative weight of each variable equal by converting each variable to a unitless measure or relative distance. The variables may be encoded as categorical variables and may have a value of either '0' or '1'. As such, there may be no scale difference issue (e.g., 10 vs. 1000) and no additional normalization or standardization of data may be required. When a corresponding machine learning model is selected, constraints for clustering may be applied. For example, the minimum or the maximum number of segments may be predetermined, or the minimum or the maximum number of entities in each segment may also be predetermined.

At 1050, in order to evaluate the performance of each machine learning model, an artificial intelligence circuitry 810 shown in FIG. 8 may identify the best performing machine learning model, which may be based on how similar output is to its own cluster compared to other clusters. In calculating an evaluation score, Silhouette Score may be used. For example, a machine learning model with the highest Silhouette Score may indicate the optimal machine learning model for output. Based on the evaluation score, the processor 802 may derive an optimal number of clusters.

In the attribute selection 900 and clustering 1000, a speed to calculate and accuracy of results may improve with the expanded data sets and refreshed data available on an ongoing basis. Moreover, the removal of attributes based on the attribute importance value and business judgment may enhance the quality of prediction and an analytical speed. In order to improve the speed of the process, at least one of parallelization (i.e., permitting multi-core utilization), multi-user functionality (i.e., multiple end-users can simultaneously run scenarios), or bulk processing (i.e., end-users may run the process for a set of variables together) may be utilized.

The system 100 may be implemented in many different ways. Each circuit or circuitry or stage may be hardware or a combination of hardware and software. The circuitry may include the text classifier 125, the multiclass classifier 126, the combination classifier 132, the feedback controller 138 the storage controller 806, the artificial intelligence circuitry 810, and/or other components and subcomponents of the system 100 described herein. For example, each circuit or circuitry may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each circuitry may include memory hardware, such as a portion of the memory 804, for example, that comprises instructions executable with the processor 802 or other processor to implement one or more of the features of the circuitry. When any one of the circuitry includes the portion of the memory that comprises instructions executable with the processor 802, the circuitry may or may not include the processor 802. In some examples, each circuitry may just be the portion of the memory 804 or other physical memory that comprises instructions executable with the processor 802 or other processor to implement the features of the corresponding circuitry without the circuitry including any other hardware. Because each circuitry includes at least some hardware even when the included hardware comprises software, each circuitry may be interchangeably referred to as a hardware circuitry.

Some features are shown stored in a computer readable storage medium (for example, as logic implemented as computer executable instructions or as data structures in memory). All or part of the system 100 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the system 100 or systems may be stored on, distributed across, or read from other computer readable storage media, for example, secondary storage devices such as hard disks, flash memory drives, floppy disks, and CD-ROMs. Moreover, the various modules, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, . . . <B>, and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A system comprising:
non-transitory memory storing instructions executable to associate a log entry with an attribute identifier; and
a processor configured to execute the instructions to:
execute a text classifier to identify a log description of the log entry and a metafield of the log entry;
execute the text classifier to determine whether the log description includes a datafield by comparing the log description with a datafield indicator;
execute a datafield classifier to generate datafield metrics for the datafield corresponding to a plurality of attribute identifiers, the datafield metrics including an accuracy value indicating an association between the datafield and the plurality of attribute identifiers;
execute a metadata classifier to generate metafield metrics for the metafield corresponding to the plurality of attribute identifiers, the metafield metrics including an accuracy value indicating an association between the metafield and the plurality of attribute identifiers;
execute a combination classifier to generate and apply weight values to the datafield metrics and the metafield metrics;
execute the combination classifier to generate weighted metrics for the log entry, the weighted metrics including an accuracy value indicating an association between the log entry and the plurality of attribute identifiers;
execute the combination classifier to evaluate an attribute importance value of each attribute identifier;
in response to the evaluation of the attribute importance value, execute the combination classifier to select an attribute identifier of the plurality of attribute identifiers having a greatest attribute importance value; and execute the combination classifier to generate a log entry association based on the weighted metrics, the log entry association including an association between the log entry and a corresponding attribute associated with the selected attribute identifier, wherein, in response to the generation of the log entry association, the processor is further configured to:

prioritize the corresponding attribute;

output a model of an implementation of resource allocations based on the log entry association; and automatically perform the resource allocations according to the outputted model.

2. The system of claim 1, wherein, when the log entry association is generated, the processor is configured to:

execute a feedback controller to receive an association feedback, the association feedback including a validity of the log entry association and a priority of a specific attribute;

provide the association feedback to the combination classifier;

adjust the weighted metrics based on the association feedback; and adjust the log entry association to associate the log entry with the specific attribute based on the adjusted weighted metrics.

3. The system of claim 2, wherein, when the association feedback is received, the processor is configured to:

execute the feedback controller to receive the association feedback;

determine the validity of the log entry association based on the association feedback; and in response to determining that the log entry association is valid, provide the association feedback to the combination classifier.

4. The system of claim 3, wherein the processor is further configured to:

in response to determining that the log entry association is invalid, correct the log entry association based on the association feedback by associating the log entry with an updated attribute; and store the corrected log entry association into the memory.

5. The system of claim 1, wherein the processor is further configured to:

determine whether the metafield metrics are greater than a predefined influence value;

in response to determining that the metafield metrics are greater than the predefined influence value, select an outlier metafield of the log entry, the outlier metafield including any statistical outlier compared with the metafield metrics of other metafields; and generate the log entry association based on the selected outlier metafield.

6. The system of claim 5, wherein the processor is further configured to:

use the selected outlier metafield for the log entry association to perform clustering.

7. The system of claim 1, wherein the processor is further configured to:

use the log entry association to perform clustering.

8. The system of claim 7, wherein, when the log entry association is used to perform the clustering, the processor is configured to:

determine a data type of an attribute associated with the log entry in the log entry association;

generate a number of clusters corresponding to the data type of the attribute, the data type including quantitative data and categorical data, wherein the clusters are used to categorize the resource allocations into segments using the corresponding attribute;

provide, to an artificial intelligence circuitry, the number of clusters to evaluate performance of each cluster, wherein the artificial intelligence circuitry executes a plurality of machine learning models that has been trained with a plurality of clusters; and in response to the evaluation of the performance of the each cluster, identify an optimal number of clusters.

9. The system of claim 8, wherein, when the performance of the each cluster is evaluated, the processor is configured to:

evaluate the performance of each machine learning model based on an evaluation score, wherein the evaluation score is determined based on a similarity of the clusters executed from the each machine learning model to target data; and in response to the evaluation of the performance of the each machine learning model, select a machine learning model having a highest evaluation score.

10. A computer-implemented method performed by a processor configured to execute instructions to associate a log entry with an attribute identifier stored in non-transitory memory, the method comprising:

identifying, by using a text classifier, a log description of the log entry and a metafield of the log entry;

determining, by using the text classifier, whether the log description includes a datafield by comparing the log description with a datafield indicator;

generating, by using a datafield classifier, datafield metrics for the datafield corresponding to a plurality of attribute identifiers, the datafield metrics including an accuracy value indicating an association between the datafield and the plurality of attribute identifiers;

generating, by using a metadata classifier, metafield metrics for the metafield corresponding to the plurality of attribute identifiers, the metafield metrics including an accuracy value indicating an association between the metafield and the plurality of attribute identifiers;

applying, by using a combination classifier, weight values to the datafield metrics and the metafield metrics;

generating, by using the combination classifier, weighted metrics for the log entry, the weighted metrics including an accuracy value indicating an association between the log entry and the plurality of attribute identifiers;

evaluating, by using the combination classifier, an attribute importance value of each attribute identifier;

in response to the evaluation of the attribute importance value, selecting, by using the combination classifier, an attribute identifier of the plurality of attribute identifiers having a greatest attribute importance value;

generating, by using the combination classifier, a log entry association based on the weighted metrics, the log entry association including an association between the log entry and a corresponding attribute associated with the selected attribute identifier;

prioritizing the corresponding attribute;

outputting a model of an implementation of resource allocations based on the log entry association; and automatically performing the resource allocations according to the outputted model.

11. The method of claim 10, wherein the generation of the log entry association includes:

receiving, by using a feedback controller, an association feedback, the association feedback including a validity of the log entry association and a priority of a specific attribute;

providing the association feedback to the combination classifier;

adjusting the weighted metrics based on the association feedback; and adjusting the log entry association to associate the log entry with the specific attribute based on the adjusted weighted metrics.

12. The method of claim 11, wherein the receiving of the association feedback includes:

receiving, by using the feedback controller, the association feedback;

determining the validity of the log entry association based on the association feedback; and in response to determining that the log entry association is valid, providing the association feedback to the combination classifier.

13. The method of claim 12, wherein the method further comprises:

in response to determining that the log entry association is invalid, correcting the log entry association based on the association feedback by associating the log entry with an updated attribute; and storing the corrected log entry association into the memory.

14. The method of claim 10, wherein the method further comprises:

determining whether the metafield metrics are greater than a predefined influence value;

in response to determining that the metafield metrics are greater than the predefined influence value, selecting an outlier metafield of the log entry, the outlier metafield including any statistical outlier compared with the metafield metrics of other metafields; and generating the log entry association based on the selected outlier metafield.

15. The method of claim 14, wherein the method further comprises:

using the selected outlier metafield for the log entry association to perform clustering.

16. The method of claim 10, wherein the method further comprises:

using the log entry association to perform clustering.

17. The method of claim 16, wherein the use of the log entry association to perform the clustering includes:

determining a data type of an attribute associated with the log entry in the log entry association;

generating a number of clusters corresponding to the data type of the attribute, the data type including quantitative data and categorical data, wherein the clusters are used to categorize the resource allocations into segments using the corresponding attribute;

providing, to an artificial intelligence circuitry, the number of clusters to evaluate performance of each cluster, wherein the artificial intelligence circuitry executes a plurality of machine learning models that has been trained with a plurality of clusters; and in response to the evaluation of the performance of the each cluster, identifying an optimal number of clusters.

18. The method of claim 17, wherein the evaluation of the performance of the each cluster includes:

evaluating the performance of each machine learning model based on an evaluation score, wherein the evaluation score is determined based on a similarity of the clusters executed from the each machine learning model to target data; and in response to the evaluation of the performance of the each machine learning model, selecting a machine learning model having a highest evaluation score.

\* \* \* \* \*